(12) United States Patent
Kimishima

(10) Patent No.: US 10,999,488 B2
(45) Date of Patent: May 4, 2021

(54) CONTROL DEVICE, IMAGING DEVICE, AND CONTROL METHOD

(71) Applicant: SONY CORPORATION, Tokyo (JP)

(72) Inventor: Yu Kimishima, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/493,599

(22) PCT Filed: Jan. 18, 2018

(86) PCT No.: PCT/JP2018/001304
§ 371 (c)(1),
(2) Date: Sep. 12, 2019

(87) PCT Pub. No.: WO2018/179695
PCT Pub. Date: Oct. 4, 2018

(65) Prior Publication Data
US 2020/0084369 A1    Mar. 12, 2020

(30) Foreign Application Priority Data

Mar. 31, 2017    (JP) .............................. JP2017-072821

(51) Int. Cl.
*H04N 5/232* (2006.01)
*G03B 13/36* (2021.01)

(52) U.S. Cl.
CPC ......... *H04N 5/23212* (2013.01); *G03B 13/36* (2013.01); *H04N 5/23219* (2013.01); *H04N 5/23293* (2013.01)

(58) Field of Classification Search
CPC .......... H04N 5/23212; H04N 5/23219; H04N 5/23293; H04N 5/232; G03B 13/36; G03B 15/00; G02B 7/34

USPC ................ 348/335, 340, 345, 348, 350, 352
See application file for complete search history.

(56) References Cited

U.S. PATENT DOCUMENTS

2015/0279012 A1* 10/2015 Brown ..................... G06T 5/50
382/284

FOREIGN PATENT DOCUMENTS

| JP | 2012-124712 A | 6/2012 |
|---|---|---|
| JP | 2017-038245 A | 2/2017 |
| JP | 2017-163412 A | 9/2017 |

OTHER PUBLICATIONS

International Search Report and Written Opinion of PCT Application No. PCT/JP2018/001304, dated Mar. 6, 2018, 10 pages of ISRWO.

* cited by examiner

*Primary Examiner* — Yogesh K Aggarwal
(74) *Attorney, Agent, or Firm* — Chip Law Group

(57) ABSTRACT

A control device including a main subject detection unit that detects a first main subject from among subjects included in a first image, and acquires main subject information indicating the first main subject, a distance information calculation unit that detects a distance of a subject included in a first image, and acquires first distance information indicating the distance, and a detection unit that detects a distance within which a first main subject is included on the basis of main subject information and first distance information, and acquires main subject distance information indicating the distance within which the first main subject is included.

17 Claims, 14 Drawing Sheets

FIG. 6A
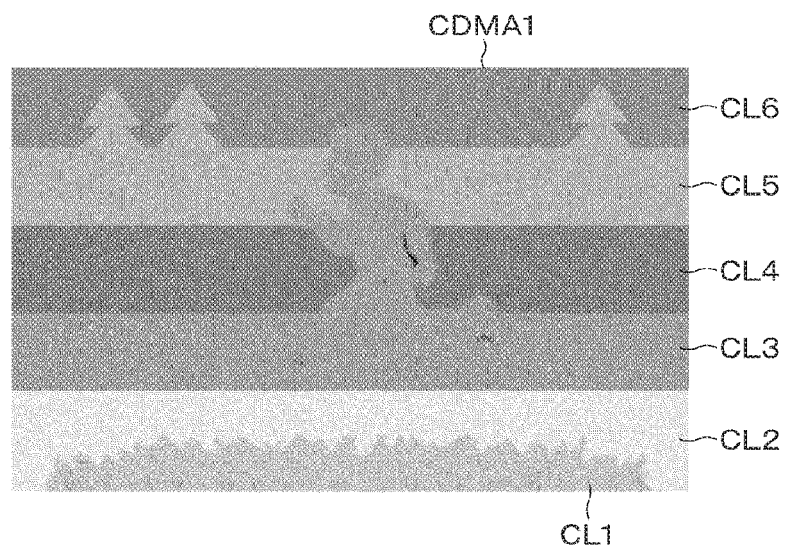
FIG. 6B
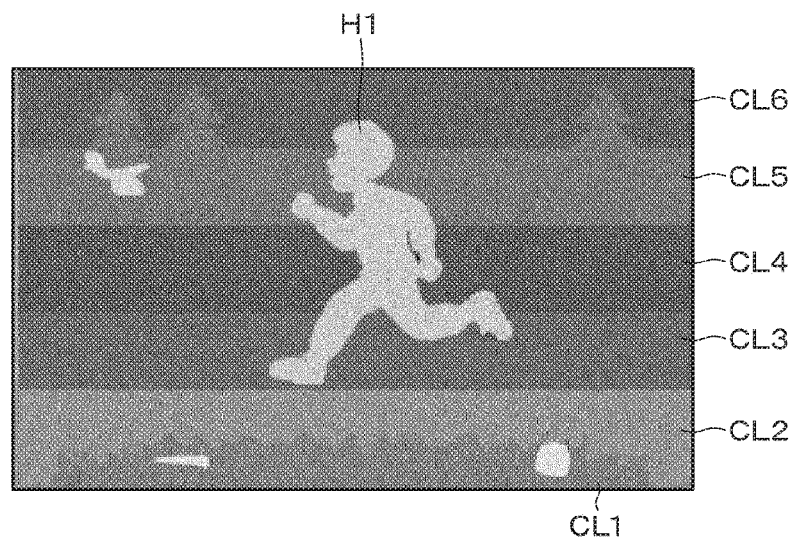
FIG. 7
| CL6 | 15m~∞ | 0% → BACKGROUND CLUSTER |
| --- | --- | --- |
| CL5 | 12m~15m | 3% → BACKGROUND CLUSTER |
| CL4 | 9m~12m | 0% → BACKGROUND CLUSTER |
| CL3 | 6m~9m | 42% → FOREGROUND CLUSTER |
| CL2 | 3m~6m | 0% → BACKGROUND CLUSTER |
| CL1 | 0m~3m | 6% → BACKGROUND CLUSTER |

CONTROL DEVICE, IMAGING DEVICE, AND CONTROL METHOD

CROSS REFERENCE TO RELATED APPLICATIONS

This application is a U.S. National Phase of International Patent Application No. PCT/JP2018/001304 filed on Jan. 18, 2018, which claims priority benefit of Japanese Patent Application No. JP 2017-072821 filed in the Japan Patent Office on Mar. 31, 2017. Each of the above-referenced applications is hereby incorporated herein by reference in its entirety.

TECHNICAL FIELD

The present disclosure relates to a control device, an imaging device, a control method, and a program.

BACKGROUND ART

Conventionally, various methods for automatically detecting the focus auto focus (AF) method) have been proposed (see Patent Document 1 below, for example).

CITATION LIST

Patent Document

Patent Document 1: Japanese Patent Application Laid-Open No. 2007-233034

SUMMARY OF THE INVENTION

Problems to be Solved by the Invention

In such a field, it is desired to accurately detect an autofocus target.

One objective of the present disclosure is to provide a control device, an imaging device, a control method, and a program that can accurately detect an autofocus target.

Solutions to Problems

The present disclosure is, for example,
a control device including:
a main subject detection unit that detects a first main subject from among subjects included in a first image, and acquires main subject information indicating the first main subject;
a distance information calculation unit that detects a distance of a subject included in a first image, and acquires first distance information indicating the distance; and
a detection unit that detects a distance within which a first main subject is included on the basis of main subject information and first distance information, and acquires main subject distance information indicating the distance within which the first main subject is included.

The present disclosure is, for example,
an imaging device including:
the control device described above; and
an imaging unit.

The present disclosure is, for example,
a control method including:
by a main subject detection unit, detecting a first main subject from among subjects included in a first image, and acquiring main subject information indicating the first main subject;
by a distance information calculation unit, detecting a distance of a subject included in a first image, and acquiring first distance information indicating the distance; and
by a detection unit, detecting a distance within which a first main subject is included on the basis of main subject information and first distance information, and acquiring main subject distance information indicating the distance within which the first main subject is included.

The present disclosure is, for example,
a program that causes a computer to execute a control method including:
by a main subject detection unit, detecting a first main subject from among subjects included in a first image, and acquiring main subject information indicating the first main subject;
by a distance information calculation unit, detecting a distance of a subject included in a first image, and acquiring first distance information indicating the distance; and
by a detection unit, detecting a distance within which a first main subject is included on the basis of main subject information and first distance information, and acquiring main subject distance information indicating the distance within which the first main subject is included.

Effects of the Invention

According to at least an embodiment of the present disclosure, it is possible to accurately detect an autofocus target. Note that the effects described herein are not necessarily limited, and any of the effects described in the present disclosure may be exerted. Further, the contents of the present disclosure should not be interpreted as being limited by the exemplified effects.

BRIEF DESCRIPTION OF DRAWINGS

FIGS. 6A and 6B are diagrams for reference in describing processing performed in the imaging device of the embodiment of the present disclosure.

FIG. 7 is a diagram for reference in describing processing performed in the imaging device of the embodiment of the present disclosure.

MODE FOR CARRYING OUT THE INVENTION

Hereinafter, embodiments and the like of the present disclosure will be described with reference to the drawings. Note that the description will be given in the following order.

<1. One Embodiment>
<2. Modification>
<3. Application Example>

The embodiments and the like described below are preferable specific examples of the present disclosure, and the contents of the present disclosure are not limited to these embodiments and the like.

1. One Embodiment

Configuration Example of Imaging Device

Figure 1:
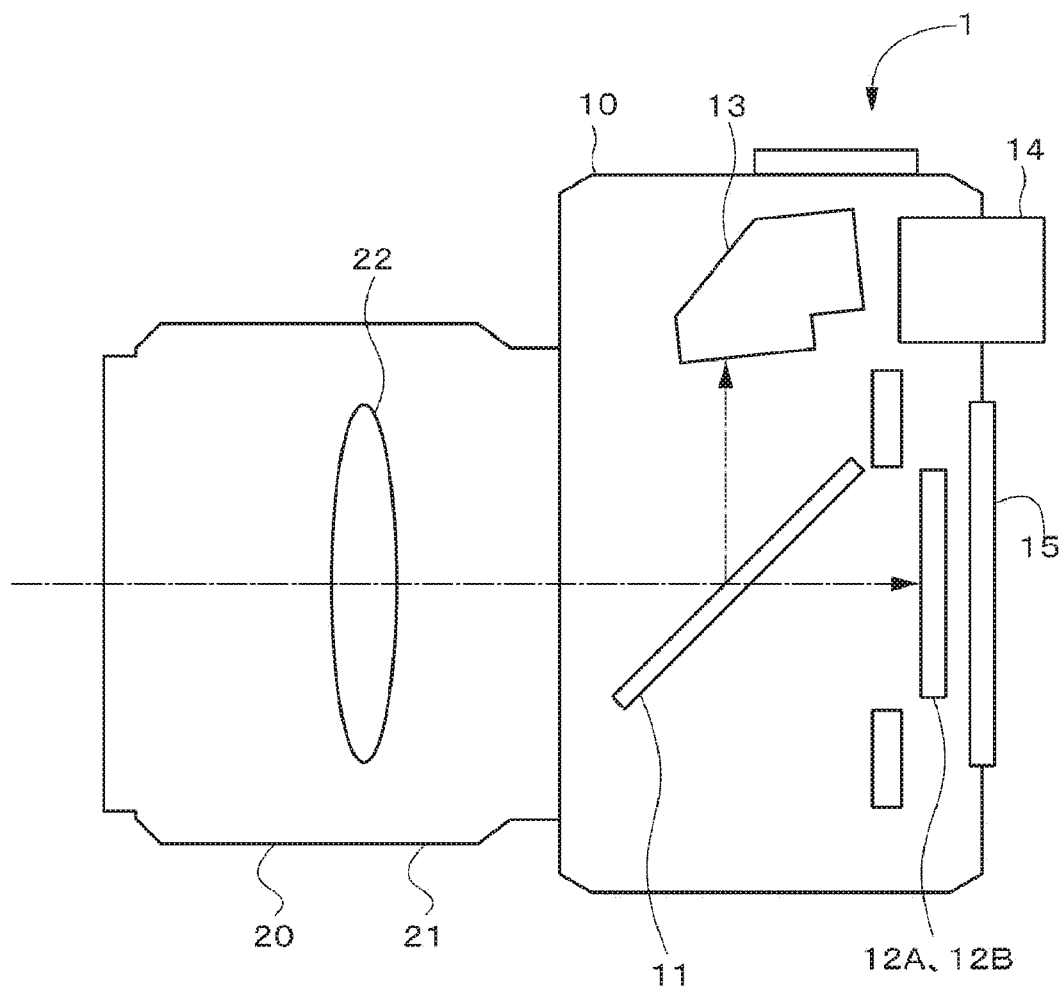
FIG. 1 is a view showing a schematic configuration of an imaging device according to an embodiment of the present disclosure.

First, a configuration example of an imaging device of an embodiment of the present disclosure will be described. FIG. 1 is a schematic cross-sectional view showing a schematic configuration of an imaging device 1 according to the embodiment of the present disclosure.

The imaging device 1 includes a housing (body) 10, an optical imaging system 20 including a taking lens 22, a semi-transparent mirror 11, an image sensor 12A, an image plane phase difference AF sensor 12B, a dedicated phase difference AF sensor 13, an electronic view finder 14, and a display 15. For example, a configuration including the image sensor 12A and the optical imaging system 20 forms an imaging unit.

As shown in FIG. 1, the optical imaging system 20 is provided for the housing 10. The optical imaging system 20 is a replaceable so-called lens unit, for example, and the taking lens 22, an aperture, and the like are provided in a lens barrel 21. The taking lens 22 is driven by a focus drive system (not shown), and is capable of an auto focus (AF) operation. Note that the optical imaging system 20 may be configured integrally with the housing 10, or the optical imaging system 20 may be attachable and detachable to and from the housing 10 through a predetermined adapter.

The semi-transparent mirror 11 is provided in the housing 10 between the taking lens 22 and the image sensor 12A in the housing 10. Subject light is incident on the semi-transparent mirror 11 through the taking lens 22. The semi-transparent mirror 11 reflects a part of the subject light incident through the taking lens 22 toward the upper dedicated phase difference AF sensor 13, and transmits a part of the subject light to the image sensor 12A. Note that it is possible to arbitrarily set the transmittance, reflectance, and the like of the semi-transparent mirror 11.

An image sensor 12A for generating a photographed image is provided in the housing 10. A charge coupled device (CCD), a complementary metal oxide semiconductor (CMOS), or the like is used as the image sensor 12A. The image sensor 12A photoelectrically converts subject light incident through the taking lens 22 into a charge amount to generate an image. The image signal is subjected to predetermined signal processing such as white balance adjustment processing and gamma correction processing, and is finally stored in a storage medium in the imaging device 1 or a portable memory removable from the imaging device 1 as image data, for example.

The image sensor 12A has red (R) pixels, green (G) pixels, and blue (B) pixels, which are normal imaging pixels, and also has the image plane phase difference AF sensor 12B that performs phase difference focus detection, for example. That is, the image plane phase difference AF sensor 12B is configured by placing image plane phase difference pixels in a part of the image sensor 12A. Each pixel forming the image sensor photoelectrically converts incident light from a subject into a charge amount, and outputs a pixel signal.

The dedicated phase difference AF sensor 13 is provided above the semi-transparent mirror 11 and in front of the image sensor 12A in the housing 10, for example. The dedicated phase difference AF sensor 13 is an AF-specific module of a phase difference detection method, for example. The subject light collected by the taking lens 22 is reflected by the semi-transparent mirror 11 to be incident on the dedicated phase difference AF sensor 13. A focus detection signal detected by the dedicated phase difference AF sensor 13 is supplied to a processor or the like that calculates a defocus amount in the imaging device 1. Thus, the imaging device 1 of the embodiment performs AF using the dedicated phase difference AF sensor 13 and the image plane phase difference AF sensor 12B. Note, however, that the present invention is not limited to this, and the AF method performed by the imaging device 1 may be an AF method using one of the dedicated phase difference AF sensor 13 and the image plane phase difference AF sensor 12B, or may use another known AF method. A hybrid AF method of multiple AF methods may be used. Note that in a case where the imaging device 1 does not include the dedicated phase difference AF sensor 13, AF is performed using the image plane phase difference AF sensor 12B.

An electronic view finder (EVF) 14 is provided in the housing 10. The electronic view finder 14 includes, for example, a liquid crystal display (LCD), an organic electroluminescence (EL) display, or the like. The electronic view finder 14 is supplied with image data obtained by processing an image signal extracted from the image sensor 12A by a signal processing unit (not shown). The electronic view finder 14 displays an image corresponding to the image data as a real-time image (through image).

The display 15 is provided in the housing 10. The display 15 is a flat display such as a liquid crystal display and an organic EL. The display 15 is supplied with image data obtained by processing an image signal extracted from the image sensor 12A by a signal processing unit (not shown), and the display 15 displays them as a real-time image (so-called through image). In FIG. 1, the display 15 is provided on the back side of the housing, but the present invention is not limited to this. The display 15 may be provided on an upper surface of the housing, for example, and may be movable or removable. The display 15 may be independent of the housing 10, and in this case, a television set or the like connected to the imaging device 1 may function as the display 15. Further, an area in which AF according to the mode is performed (hereinafter referred to as AF area as appropriate) is superimposed on the real-time image and displayed on the display 15.

Internal Configuration Example of Imaging Device

Figure 2:
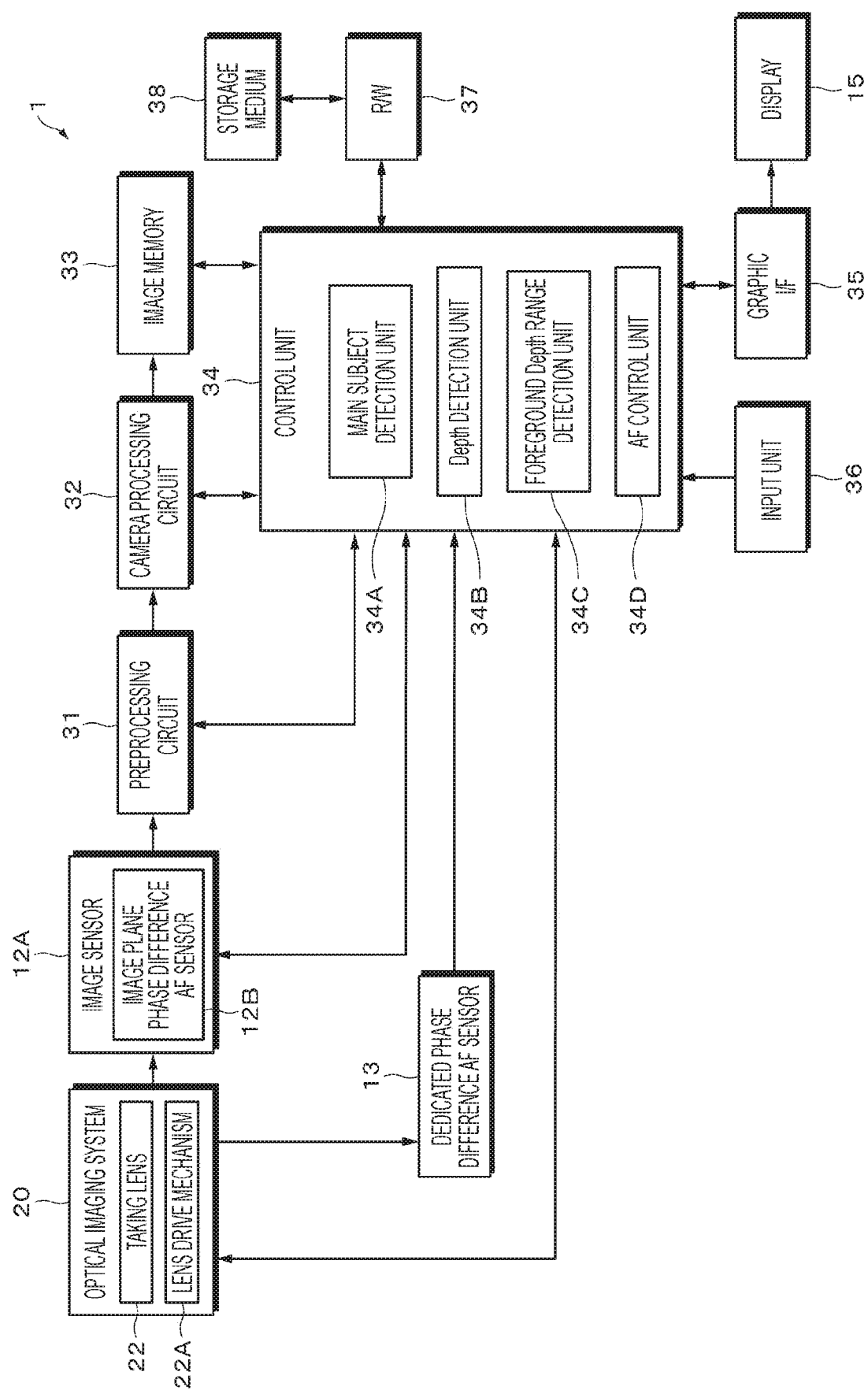
FIG. 2 is a block diagram showing a configuration example of the imaging device according to the embodiment of the present disclosure.

Next, an example of an internal configuration of the imaging device 1 (example of configuration mainly related to signal processing) will be described with reference to a block diagram of FIG. 2. The imaging device 1 includes, in addition to the optical imaging system 20, the dedicated phase difference AF sensor 13, the image sensor 12A, the image plane phase difference AF sensor 12B, and the display 15 described above, a preprocessing circuit 31, a camera processing circuit 32, an image memory 33, a control unit 34, a graphic interface (I/F) 35, an input unit 36, a reader/writer (R/W) 37, and a storage medium 38, for example.

The optical imaging system 20 is configured of the taking lens 22 (including focus lens, zoom lens, and the like) for concentrating light from a subject onto the image sensor 12A, a lens drive mechanism 22A for moving the focus lens to adjust focus, a shutter mechanism, an iris mechanism, and other parts. These parts are driven on the basis of a control signal from the control unit 34. The lens drive mechanism 22A achieves an AF operation by moving the taking lens 22 along the optical axis direction in accordance with a control signal supplied from the control unit 34 (e.g., later-described AF control unit 34D). An optical image of the subject obtained through the optical imaging system 20 is formed on the image sensor 12A serving as an imaging device.

The dedicated phase difference AF sensor 13 is, for example, an autofocus-specific sensor of a phase difference detection method. The subject light collected by the taking lens 22 is reflected by the semi-transparent mirror 11 to be incident on the dedicated phase difference AF sensor 13. The focus detection signal detected by the dedicated phase difference AF sensor 13 is supplied to the control unit 34.

As described above, the image sensor 12A has normal imaging pixels and phase difference detection pixels. The image plane phase difference AF sensor 12B is an autofocus sensor including multiple phase difference detection pixels. The focus detection signal detected by the image plane phase difference AF sensor 12B is supplied to the control unit 34.

The preprocessing circuit 31 performs sample hold and the like on an imaging signal output from the image sensor 12A to maintain a good signal/noise (S/N) ratio by correlated double sampling (CDS) processing. Moreover, the gain is controlled by auto gain control (AGC) processing, analog/digital (A/D) conversion is performed, and a digital image signal is output.

The camera processing circuit 32 performs signal processing such as white balance adjustment processing, color correction processing, gamma correction processing, Y/C conversion processing, and auto exposure (AE) processing on the image signal from the preprocessing circuit 31.

The image memory 33 is a buffer memory configured of a volatile memory such as a dynamic random access memory (DRAM), and temporarily stores the image data subjected to predetermined processing by the preprocessing circuit 31 and the camera processing circuit 32.

The control unit 34 is configured of, a central processing unit (CPU), a random access memory (RAM), a read only memory (ROM), and other parts, for example. The ROM stores a program and the like to be read and executed by the CPU. The RAM is used as a work memory of the CPU. The CPU controls the entire imaging device 1 by executing various processing and issuing commands according to the program stored in the ROM.

Furthermore, the control unit 34 has, as functional blocks, a main subject detection unit 34A, a depth detection unit 34B which is one example of a distance information calculation unit, a foreground depth range detection unit 34C which is one example of a detection unit, and an AF control unit 34D, for example. The processing performed by each of these function blocks will be described later. Note that in the present specification, the main subject is referred to as the foreground, and a subject that is not the main subject is referred to as the background. The main subject is a subject that is considered to be important to the user among multiple subjects, and more specifically, is a subject including a portion that the user wants to focus on.

The graphic I/F 35 generates an image signal to be displayed on the display 15 from the image signal supplied from the control unit 34, and supplies the signal to the display 15 to display an image. The display 15 displays a through image being captured, an image recorded in the storage medium 38, and the like.

The input unit 36 includes, for example, a power button for switching between power on and off, a release button for giving an instruction on start of recording of a captured image, a controller for zoom adjustment, a touch screen formed integrally with the display 15, and other parts. When an input is made to the input unit 36, a control signal corresponding to the input is generated and output to the control unit 34. Then, the control unit 34 performs arithmetic processing and control corresponding to the control signal.

The R/W 37 is an interface to which a storage medium 38 for recording image data and the like generated by imaging is connected. The R/W 37 writes the data supplied from the control unit 34 to the storage medium 38, and outputs the data read from the storage medium 38 to the control unit 34. The storage medium 38 is, for example, a mass storage medium such as a hard disk, a memory stick (registered trademark of Sony Corporation), an SD memory card, or the like. An image is stored compressed in accordance with a standard such as JPEG. In addition, exchangeable image file format (EXIF) data including additional information such as information regarding the stored image and the captured date and time is also stored in association with the image.

Basic Operation Example of Imaging Device

Here, the basic operation of the above-described imaging device 1 will be described. Before capturing an image, signals that are received by the image sensor 12A and photoelectrically converted are sequentially supplied to the preprocessing circuit 31. The preprocessing circuit 31 performs CDS processing, AGC processing, and the like on the input signal, and further converts the signal into an image signal.

The camera processing circuit 32 performs image quality correction processing on the image signal supplied from the preprocessing circuit 31, and supplies the image signal as a through image signal to the graphic I/F 35 through the control unit 34. With this, a through image is displayed on the display 15. The user can view the through image displayed on the display 15 and adjust the angle of view.

In this state, when the shutter button of the input unit 36 is pressed, the control unit 34 outputs a control signal to the optical imaging system 20 to operate the shutter that forms the optical imaging system 20. As a result, an image signal for one frame is output from the image sensor 12A.

The camera processing circuit 32 performs image quality correction processing on the image signal for one frame supplied from the image sensor 12A through the preprocessing circuit 31, and supplies the processed image signal to the control unit 34. The control unit 34 compresses and encodes the input image signal, and supplies the generated encoded data to the R/W 37. Thus, a data file of the captured still image is stored in the storage medium 38 through the R/W 37. Note that at the time of shooting a moving image, the above-described processing is performed in real time in accordance with a moving image shooting instruction. It is also possible to capture a still image while shooting a moving image by pressing the shutter button while shooting the moving image.

On the other hand, in a case where an image file stored in the storage medium 38 is to be reproduced, the control unit 34 reads a selected still image file from the storage medium 38 through the R/W 37 in response to an operation input from the input unit 36. Decompression decoding processing is performed on the read image file. Then, the decoded image signal is supplied to the graphic I/F 35 through the control unit 34. As a result, the still image stored in the storage medium 38 is displayed on the display 15.

Problems to be Considered About Autofocus

Here, problems to be considered about autofocus will be described. A technology has been proposed in which a main subject is recognized by performing main subject detection processing using various image processing technologies, and the main subject is preferentially focused. However, the main subject detected by the main subject detection processing may not necessarily coincide with the main subject intended by the user. Especially for high-end users such as professional photographers, it is undesirable that their intended subject is not recognized as the main subject and other subjects are focused. This may even cause the photographer to miss a critical scene. While high-end users often want to perform AF within their own set AF areas, it is difficult even for professional photographers to keep the subject within the limited AF area.

In addition, main subject detection processing often requires a longer calculation time than distance information detection processing for AF (ranging operation), and in that case, a time lag (delay) occurs with respect to the latest ranging result. In a case where AF is to be performed using the latest ranging result, since there is only a previous (old) main subject recognition result, movement of the subject at the time when the delay occurs is not taken into consideration. On the other hand, if AF is performed after completion of the main subject detection processing operation, since focusing is performed according to the previous ranging result, AF trackability with respect to movement of the subject in the Z-axis direction (depth direction) decreases.

Figure 3:
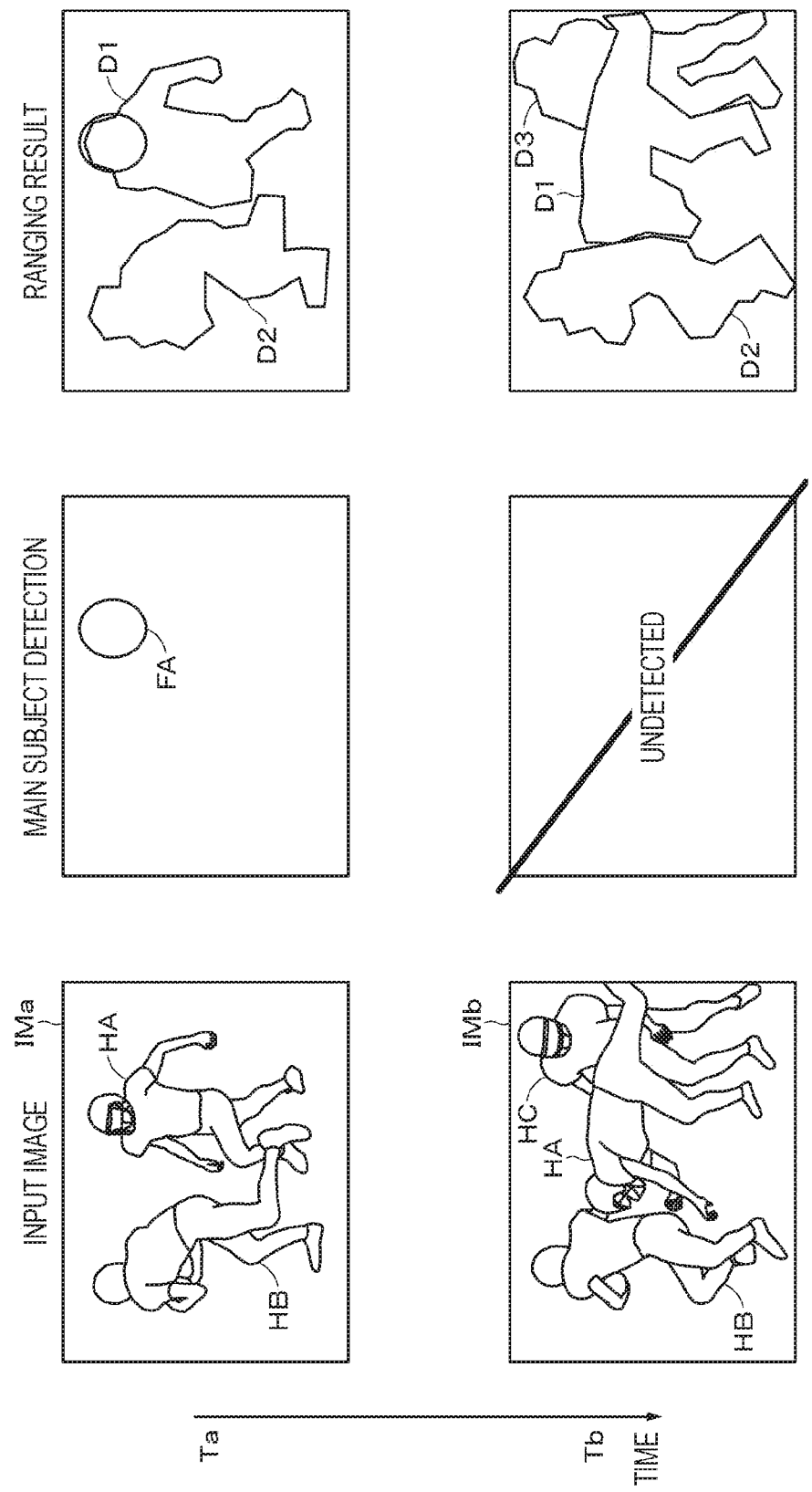
FIG. 3 is a diagram for describing a problem to be considered in performing autofocus.

This point will be described with reference to FIG. 3. Assume that an image IMa is acquired (input) as an input image at a certain time Ta. Assume that main subject detection processing is performed on the image IMa, and a face FA of an American football player HA located near the center is detected as the main subject, for example. On the other hand, distance information detection processing is performed on the image IMa, and distance information regarding a subject in the image IMa is obtained as a ranging result. FIG. 3 shows an example in which distance information D1 is obtained as a ranging result of the player HA, and distance information D2 is obtained as a ranging result of a player HB who is another player.

Assume that an image IMb is acquired as an input image at the next (later) time Tb. The image IMb is an image one frame after the image IMa, for example. The image IMb may be an image several frames after the image IMa. The image IMb includes a player HC in addition to the above-described players HA and HB. Distance information detection processing is performed on the image IMb, and distance information regarding a subject in the image IMb is obtained as a ranging result. FIG. 3 shows an example in which the distance information D1 is obtained as the ranging result of the player HA, the distance information D2 is obtained as the ranging result of the player HB, and distance information D3 is obtained as the ranging result of the player HC.

As described above, main subject detection processing requires longer calculation time than distance information detection processing. For this reason, main subject detection processing is not completed at the point when distance information detection processing is completed and the ranging result is obtained. Hence, in a case where AF is performed using the ranging result at time Tb, as described above, movement of the subject between times Ta and Tb is not taken into consideration. On the other hand, if completion of main subject detection processing is awaited, the player HA moves in the Z-axis direction (depth direction) of the subject during that time, causing a lag between the actual distance and the ranging result. This decreases AF trackability with respect to movement of the subject in the Z-axis direction. Hereinafter, on the basis of these points, an embodiment of the present disclosure will be described in detail.

Operation Example of Imaging Device

Operation of Detecting Foreground Depth Range

Figure 4:
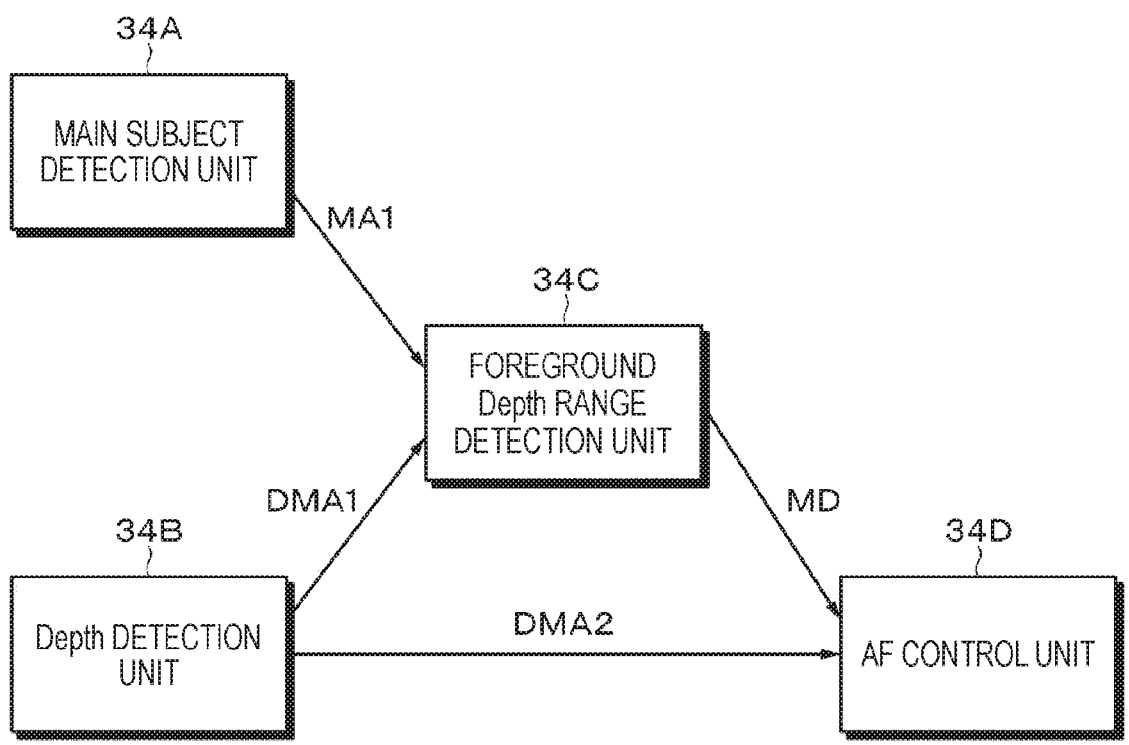
FIG. 4 is a diagram for describing processing performed by each functional block in a control unit.

An operation example of the imaging device 1 will be described. First, an operation example of detecting the foreground depth range will be described with reference to FIGS. 4, 5A, 5B, 5C, 6A, 6B, 7, 8A, 8B, and, 8C. The foreground depth range is a distance within which the main subject is included, and is described as a predetermined distance range within which the main subject is included in the embodiment. However, the foreground depth range may be the distance itself. FIG. 4 shows the main subject detection unit 34A, the depth detection unit 34B, the foreground depth range detection unit 34C, and the AF control unit 34D, which are functional blocks that form the control unit 34.

Figure 5A:
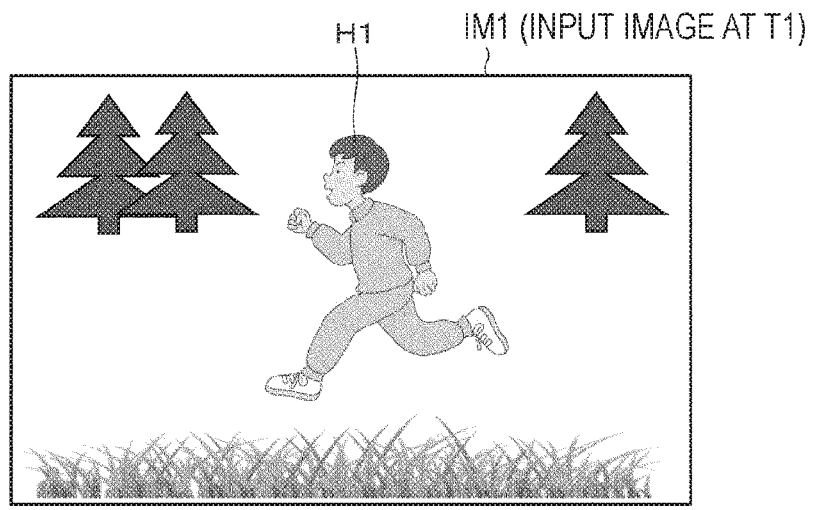
FIGS. 5A, 5B, and 5C are diagrams for reference in describing processing performed in the imaging device of the embodiment of the present disclosure.

Assume that an image IM1 (one example of first image) is acquired by the imaging device 1 as an input image at a certain time T1. FIG. 5A shows one example of the image IM1. The image IM1 is an image including grass on the front side, a person H1 running from the right to left of the screen on the back side, and a forest (indicated by three trees in FIG. 5A) in the background.

Figure 5B:
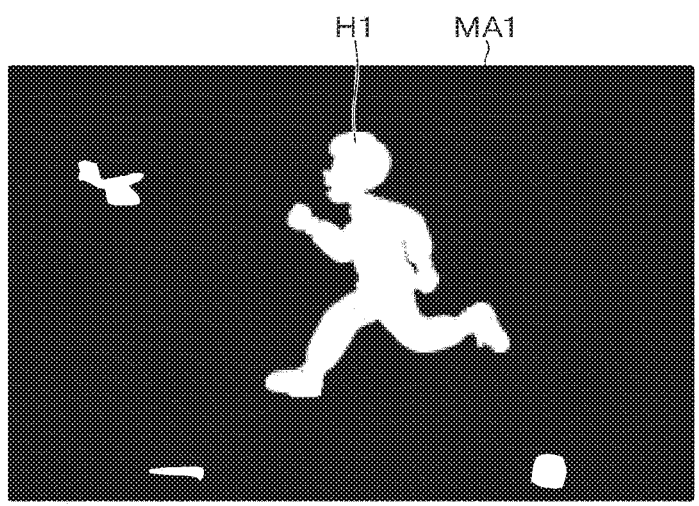

The image IM1 is input to each of the main subject detection unit 34A and the depth detection unit 34B. The main subject detection unit 34A performs main subject detection processing of detecting a main subject (first main subject) from among the subjects included in the image IM1. The main subject detection unit 34A detects a motion on the basis of a difference between frames, for example, and regards a subject whose motion is detected as the main subject. The main subject detection unit 34A performs main subject detection processing to detect the main subject, and acquires a main subject map MA1 (one example of main subject information) indicating the main subject. That is, the main subject map MA1 is information indicating an area in which the main subject is present. FIG. 5B shows one example of the main subject map MA1. A white portion in the main subject map MA1 is identified as a moving main subject. Note that in the main subject map MA1 shown in FIG. 5B, white portions locally exist in addition to the portion corresponding to the person H1 due to the influence of noise. The main subject map MA1 is supplied to the foreground depth range detection unit 34C.

Figure 5C:
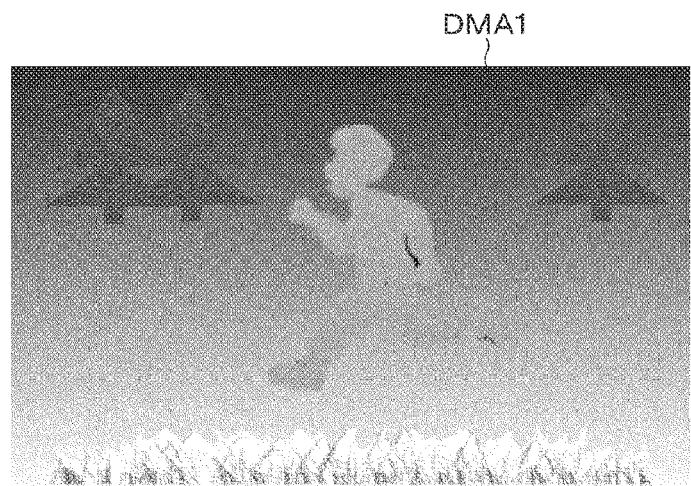

The depth detection unit 34B detects the distance of the subject included in the image IM1 by performing distance information detection processing. The depth detection unit 34B performs distance information detection processing using sensor information obtained from the image plane phase difference AF sensor 12B and the dedicated phase difference AF sensor 13, for example. Note that distance information detection processing may be performed using sensor information obtained from one of the image plane phase difference AF sensor 12B and the dedicated phase difference AF sensor 13 depending on the area in which to detect distance information. The depth detection unit 34B detects the distance of the subject included in the image IM1, and acquires a depth map DMA1 (one example of first distance information). FIG. 5C shows one example of the depth map DMA1. In the depth map DMA1 shown in FIG. 5C, the length of the distance is represented by black and white shading. The shorter the distance, the brighter the white is displayed, and the longer the distance, the darker the black is displayed. The depth map DMA1 is supplied to the foreground depth range detection unit 34C.

The foreground depth range detection unit 34C detects the foreground depth range on the basis of the main subject map MA1 and the depth map DMA1. One example of processing for detecting the foreground depth range performed by the foreground depth range detection unit 34C will be described. The foreground depth range detection unit 34C performs clustering (also referred to as cluster analysis or cluster classification) of decomposing the depth map DMA1 into finite clusters. As a method of clustering, a method called k-means method can be applied, for example.

FIG. 6A shows a depth map CDMA1 as one example of a clustered depth map. With the clustering by the foreground depth range detection unit 34C, the distance information indicated by the depth map DMA1 is classified into six clusters (clusters CL1 to CL6).

FIG. 7 shows one example of distance information corresponding to the cluster CL. For example, cluster CL1 corresponds to 0 to 3 meters (m), cluster CL2 corresponds to 3 to 6 meters, cluster CL3 corresponds to 6 to 9 meters, cluster CL4 corresponds to 9 to 12 meters, cluster CL5 corresponds to 12 to 15 meters, and cluster CL6 corresponds to 15 meters or longer. Note that the boundary value between clusters CL may be included in any one of the clusters CL. For example, 3 meters, which is the boundary value between cluster CL1 and cluster CL2, may be included in cluster CL1 or may be included in cluster CL2.

Next, the foreground depth range detection unit 34C performs match processing of matching the clustered depth map CDMA1 with the main subject map MA1. FIG. 6B shows the result of match processing. Then, the foreground depth range detection unit 34C obtains the proportion of the main subject included in each cluster CL. This proportion is indicated by the ratio of the area (number of pixels) of the main subject to the area (number of pixels) forming each cluster CL, for example. Note that when the ratio of the area of the main subject to the area of each cluster CL is obtained, the area of the main subject may be weighted according to the position of the main subject on the screen (map), or may be weighted according to the main subject-likeness. At this time, as an example of weighting according to the position, a larger (stronger) weight may be assigned to a position closer to the center of the screen, for example. Additionally, as an example of weighting according to the main subject-likeness, an evaluation value indicating the main subject-likeness may be acquired on the basis of a known recognition technology or the like, and a larger (stronger) weight may be assigned to a larger evaluation value as having a higher main subject-likeness.

FIG. 7 shows one example of the proportion of the main subject included in each cluster CL. The foreground depth range detection unit 34C detects a cluster in which the proportion of the main subject is equal to or larger than a certain threshold as the foreground depth range. That is, the foreground depth range is information indicating the area of the detected cluster. As shown in FIG. 7, assume that the percentage of the main subject included in cluster CL1 is 6%, the percentage of the main subject included in cluster CL2 is 0%, the percentage of the main subject included in cluster CL3 is 42%, the percentage of the main subject included in cluster CL4 is 0%, the percentage of the main subject included in cluster CL5 is 3%, and the percentage of the main subject included in cluster CL6 is 0%, for example. At this time, in a case where the threshold is set to 6 meters, for example, the foreground depth range detection unit 34C detects a distance range (6 to 9 meters) corresponding to cluster CL3 as the foreground depth range. Note that the foreground depth range detection unit 34C can also detect a cluster with the largest proportion of the main subject as the foreground depth range. The foreground depth range detection unit 34C acquires foreground depth range information MD (one example of main subject distance information) which is information indicating the detected foreground depth range. Then, the foreground depth range detection unit 34C supplies the foreground depth range information MD to the AF control unit 34D. The foreground depth range information MD supplied to the AF control unit 34D is held in a memory or the like included in the control unit 34. Note that the processing of detecting the foreground depth range is performed periodically, and according to the frame cycle, for example.

Figure 8A:
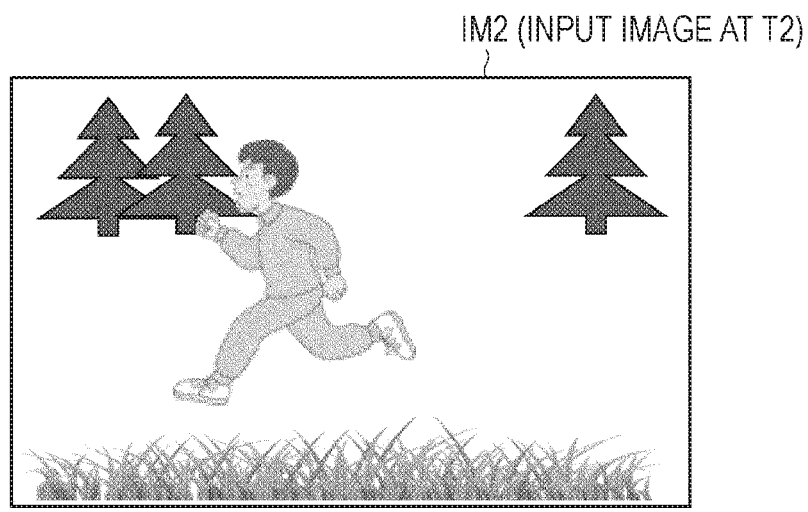
FIGS. 8A, 8B, and 8C are diagrams for reference in describing processing performed in the imaging device of the embodiment of the present disclosure.

Next, assume that an image IM2 (one example of second image) is acquired by the imaging device 1 as an input image at time T2 which is later than time T1. The image IM2 is, an image one frame after the image IM1, and is an image acquired most recently, for example. FIG. 8A shows one example of the image IM2.

Figure 8B:

The depth detection unit 34B performs distance information detection processing to detect the distance of each subject included in the image IM2, and acquires the depth map DMA2 (one example of second distance information). FIG. 8B shows one example of the depth map DMA2. Similarly to the case of the depth map DMA1, in the depth map DMA2 shown in FIG. 8B, the length of the distance is represented by black and white shading. The shorter the distance, the brighter the white is displayed, and the longer the distance, the darker the black is displayed. The depth map DMA2 is supplied to the AF control unit 34D.

The AF control unit 34D detects the main subject included in the depth map DMA2, that is, the main subject (second main subject) included in the image IM2, on the basis of the foreground depth range information MD detected using the previous frame. The AF control unit 34D performs clustering of decomposing the depth map DMA2 into finite clusters. As a method of clustering, a method called k-means method similar to the case of the depth detection unit 34B can be applied, for example.

Figure 8C:
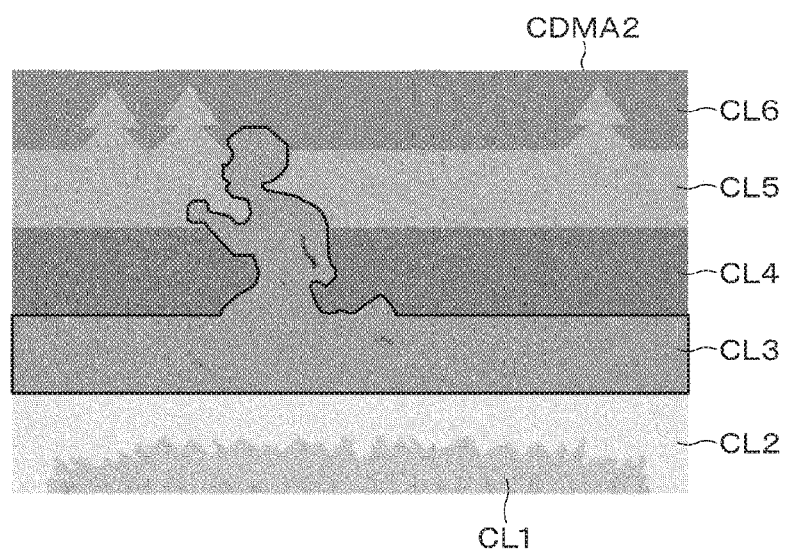

FIG. 8C shows a depth map CDMA2 as one example of a clustered depth map. Even in the case of a moving subject, there is only a slight movement in the Z-axis direction during the time and execution of distance information detection processing of one frame. Accordingly, the depth map CDMA2 is classified into clusters substantially similar to those of the depth map CDMA1 (e.g., six clusters CL1 to CL6).

For example, in a case where the foreground depth range is 6 to 9 meters as described above, the AF control unit 34D detects that the main subject is present in the range of 6 to 9 meters in the depth map DMA2, that is, in the area corresponding to cluster CL3. One example of a range in which the main subject is detected to be present is surrounded by a thick line in FIG. 8C.

Thus, even if main subject detection processing is not completed at time T2 and there is no main subject map, the foreground depth range obtained using a past frame (e.g., previous frame) can be used to detect where the main subject is present in the latest frame.

Figure 9:
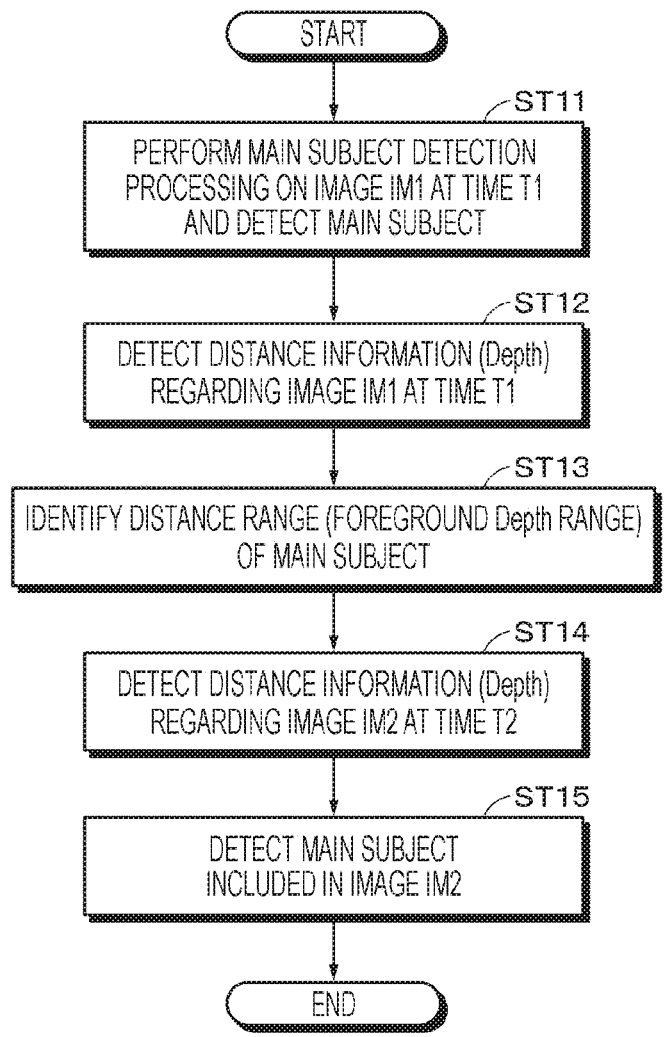
FIG. 9 is a flowchart showing a flow of processing performed in the imaging device of the embodiment of the present disclosure.

FIG. 9 is a flowchart showing a flow of processing for detecting the foreground depth range. In step ST11, the main subject detection unit 34A performs main subject detection processing on the image IM1, which is an input image at time T1, and detects a main subject in the image IM1. The main subject map MA1, which is the detection result, is supplied to the foreground depth range detection unit 34C. Then, the processing proceeds to step ST12.

In step ST12, the depth detection unit 34B performs distance information detection processing on the image IM1, and detects distance information regarding each subject in the image IM1. The depth map DMA1, which is the detection result, is supplied to the foreground depth range detection unit 34C. Then, the processing proceeds to step ST13.

In step ST13, the foreground depth range detection unit 34C detects the foreground depth range using the main subject map MA1 and the depth map DMA1. The contents of processing in which the foreground depth range detection unit 34C detects the foreground depth range have been described above, and therefore redundant descriptions will be omitted. The foreground depth range information MD indicating the foreground depth range is supplied to the AF control unit 34D. Then, the processing proceeds to step ST14.

In step ST14, the image IM2 is input as an input image at time T2 which is later than time T1. The depth detection unit 34B performs distance information detection processing on the image IM2, and detects distance information of each subject in the image IM2. The depth map DMA2, which is the detection result, is supplied to the AF control unit. Then, the processing proceeds to step ST15. Thereafter, at each timing when the main subject detection processing is performed by the main subject detection unit 34A, a similar processing continued from step ST11 is performed on the basis of the latest main subject information obtained by the main subject detection processing.

The AF control unit 34D detects the main subject included in the depth map DMA2 on the basis of the foreground depth range information MD, and detects the main subject included in the image IM2. Since the processing of detecting the main subject on the basis of the foreground depth range information MD by the AF control unit 34D has been described above, redundant descriptions will be omitted. With the above process, the main subject in the current frame can be detected, even if the main subject detection processing for the image IM2 by the main subject detection unit 34A is not completed.

First Control Example

The foreground depth range information MD can be used for various processing of the imaging device 1, such as processing in AF control. Specifically, the foreground depth range information MD can be used for processing in which the AF control unit 34D controls lens movement on the basis of the detection result of the main subject (e.g., second main subject included in above-described image IM2) included in the most recent image. Hereinafter, examples (first to third control examples) of AF control using the foreground depth range information MD will be described. Note that in the following description, the same or similar configurations as those described in the processing of detecting the foreground depth range are denoted by the same reference symbols, and redundant descriptions will be omitted as appropriate.

The following control is control performed in a mode in which an AF area is locally selected from among multiple AF areas presented as a user interface (UI). The AF area is presented to the user by being displayed as a colored rectangular frame on the display 15, for example. The user selects one AF area as an area for performing AF from among multiple AF areas, for example. Such an AF mode is called a spot, or the like. While an example in which a spot is selected as an example of the AF mode will be described below, the processing described below may be performed in an AF mode other than the spot.

FIG. 10A shows one example of an image IM3 displayed on the display 15 at time T3. Time T3 may be the same time as time T2 described above. The display 15 shows an AF area AR1 set by the user. AF is performed in the range designated by the AF area AR1. Note that the AF area AR1 is an area presented as a UI, and sensor information used for AF performed in the AF area AR1 is not necessarily limited to sensor information output from a sensor in the AF area AR1 (e.g., image plane phase difference AF sensor 12B). That is, the AF area AR1 used as a UI and the range of the AF sensor used when performing AF in signal processing do not necessarily have to coincide with each other.

Figure 10:
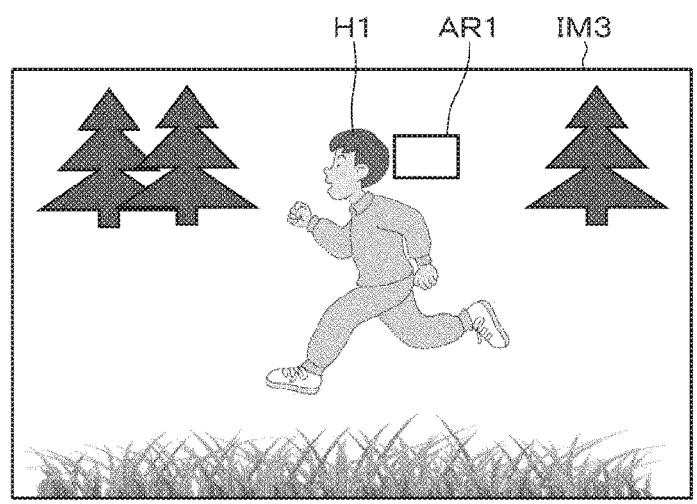
FIG. 10 is a diagram for reference in describing first control performed in the imaging device of the embodiment of the present disclosure.

Here, assume that the user is a professional photographer, for example. Such a user can perform camera work in which a moving main subject (e.g., face of person H1) is aligned with one local and narrow AF area AR1. However, even professional photographers have limitations in manual operation. Hence, as shown in FIG. 10, sometimes the main subject (e.g., face of person H1) may slip from the AF area AR1, and AF may be performed on the background. Such a phenomenon in which the background is unintentionally focused is also referred to as rear focus. In particular, in a case where the person H1 is a player of sports including a lot of movement such as football and soccer, there is a high possibility that rear focus will occur.

For this reason, in the first control example, in a case where there is only background in the AF area AR1 during the AF operation, the effective AF area is expanded to peripheral areas, and then it is determined whether or not the main subject is present in the expanded AF area. If the main subject is present in the expanded AF area, AF is performed in the AF area. This prevents AF from being performed on the background.

Figure 11:
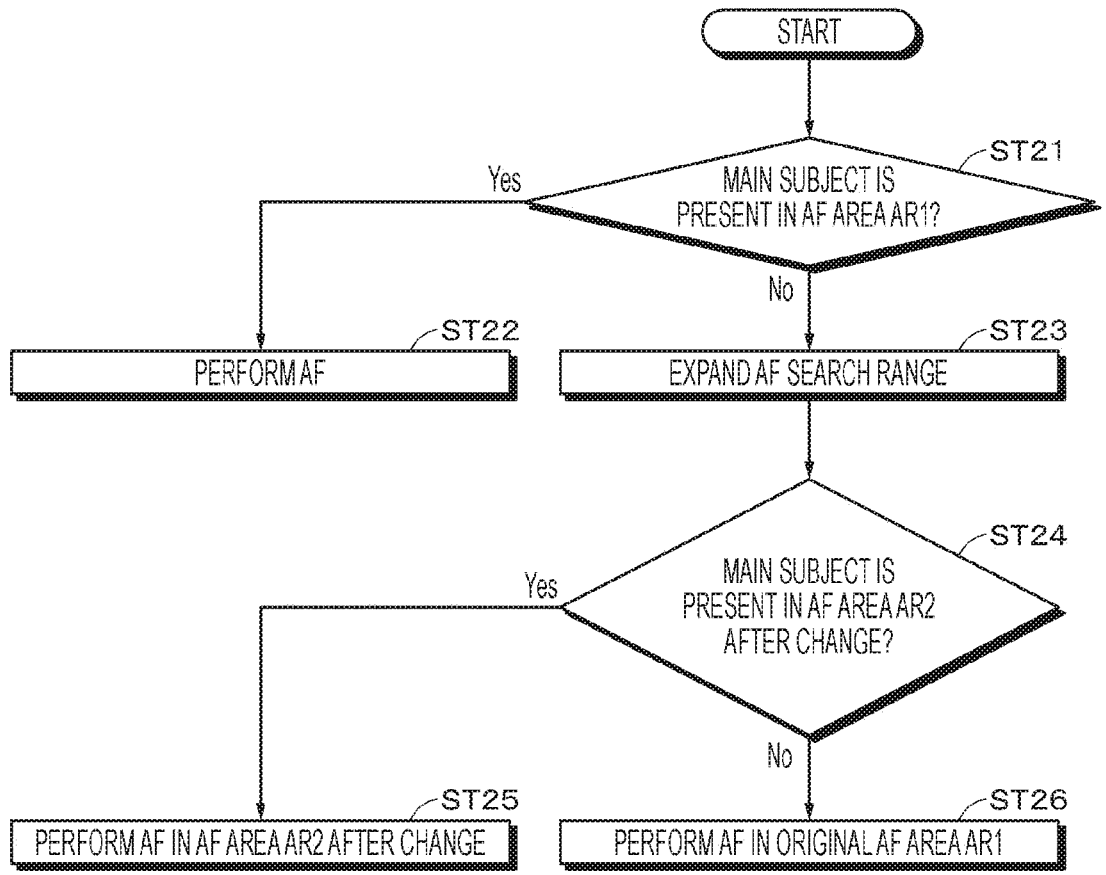
FIG. 11 is a flowchart showing a flow of processing of the first control performed in the imaging device of the embodiment of the present disclosure.
Figure 12:
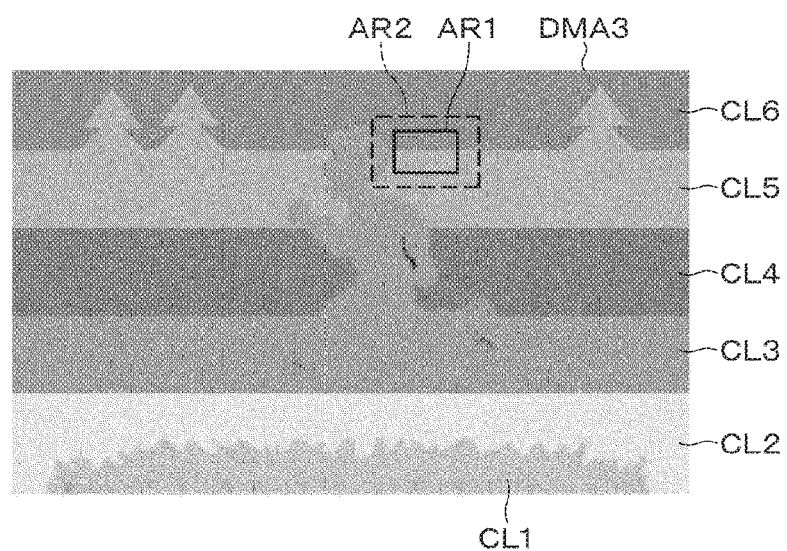
FIG. 12 is a diagram for reference in describing the first control performed in the imaging device of the embodiment of the present disclosure.

The first control example will be described specifically with reference to FIGS. 11 and 12. FIG. 11 is a flowchart showing a flow of processing of the first control, and FIG. 12 shows a depth map DMA3 which is a depth map of the image IM3 acquired most recently. Note that the foreground depth range can be acquired by the above-described control using an image acquired before the image IM3, and in this example, is cluster CL3 (e.g., 6 to 9 meters). The following processing is performed by the control unit 34 (e.g., AF control unit 34D).

In step ST21 in the flowchart of FIG. 11, it is determined whether or not a main subject is present in the set AF area AR1. For example, as shown in FIG. 12, it is determined whether or not cluster CL3 is included in the AF area AR1 by use of the depth map DMA3. Here, if cluster CL3 is included in the AF area AR1, it is assumed that the main subject is in the AF area AR1 and the processing proceeds to step ST22.

In step ST22, AF is performed in the AF area AR1, and the lens position is controlled so that the area corresponding to the AF area AR1 is in focus. The lens position is performed by the AF control unit 34D controlling the lens drive mechanism 22A.

In this example, as shown in FIG. 12, cluster CL3 is not included in the AF area AR1. That is, since the determination in step ST21 is negative, the processing proceeds to step ST23.

In step ST23, processing for expanding the AF search range is performed, and processing for changing the AF area is performed. In FIG. 12, an AF area AR2 which is the AF area after the change is indicated by a dotted line. The size of the AF area AR2 can be set as appropriate. For example, the size of the AF area AR2 is the size of several AF areas AR1. Then, the processing proceeds to step ST24.

In step ST24, it is determined whether or not the main subject is present in the AF area AR2 after the change. In this example, since cluster CL3 is included in the AF area AR2, that is, since the main subject is present in the AF area AR2, the processing proceeds to step ST25.

In step ST25, AF is performed in the AF area AR2, and the lens position is controlled so that the area corresponding to the AF area AR2 is in focus.

In the determination of step ST24, since cluster CL3 is not included in the AF area AR2 after the change, that is, since the main subject is not present in the AF area AR2, the processing proceeds to step ST26.

In step ST26, since the main subject is not present even around the set AF area AR1, AF is performed in the AF area AR1, which is the originally set AF area, and the lens position is controlled so that the area corresponding to the AF area AR1 is in focus.

In the first control example, even in a case where there is no main subject in the AF area set by the user, the range of the AF area is expanded in consideration of the fact that the main subject is often present around the AF area. If the main subject is present in the expanded AF area, AF is performed in the expanded AF area. This makes it possible to prevent AF from being performed on the background in a case where there is no main subject in the AF area set by the user.

Note that the AF area AR2 after the change is preferably not displayed on the display 15 to give respect to the user's intention (intention that set AF area is AF area AR1), but may be displayed. In the case of displaying the AF area AR2, the AF area AR2 may be displayed temporarily to notify the user of the expansion of the range of the AF area, and the AF area of the normal range may be displayed thereafter. Additionally, when expanding the AF area, the AF area may be gradually expanded in multiple steps, and it may be determined whether or not the main subject is present in the AF area after the change in each step.

Second Control Example

Next, the second control will be described. For example, assume that an operation of largely shaking the imaging device 1 is performed when switching the main subject. Consider a case where, at the timing of completion of the operation, only the background is present in the AF area AR1 set by the user and the background is in focus. Thereafter, the user quickly moves the imaging device 1 so that the main subject is included in the AF area AR1.

Incidentally, in an imaging device, so-called stabilization processing is generally performed in which, in case a person or the like cuts across in front of a point which has been brought into focus once, a point where AF has been performed once is locked and the lens position is fixed or the reactivity of the lens movement is adjusted to prevent AF from being performed on the crossed person or the like. Due to the stabilization processing, in some cases, AF is not performed on the main subject even if the user moves the imaging device 1 quickly so that the main subject is included in the AF area AR1. On the other hand, if AF is always performed on the front side without performing the stabilization processing, there is a problem that AF is performed on an object cutting across in front of the main subject and the stability of AF is impaired. The second control example is control that uses the foreground depth range information MD to avoid these problems.

Figure 13:
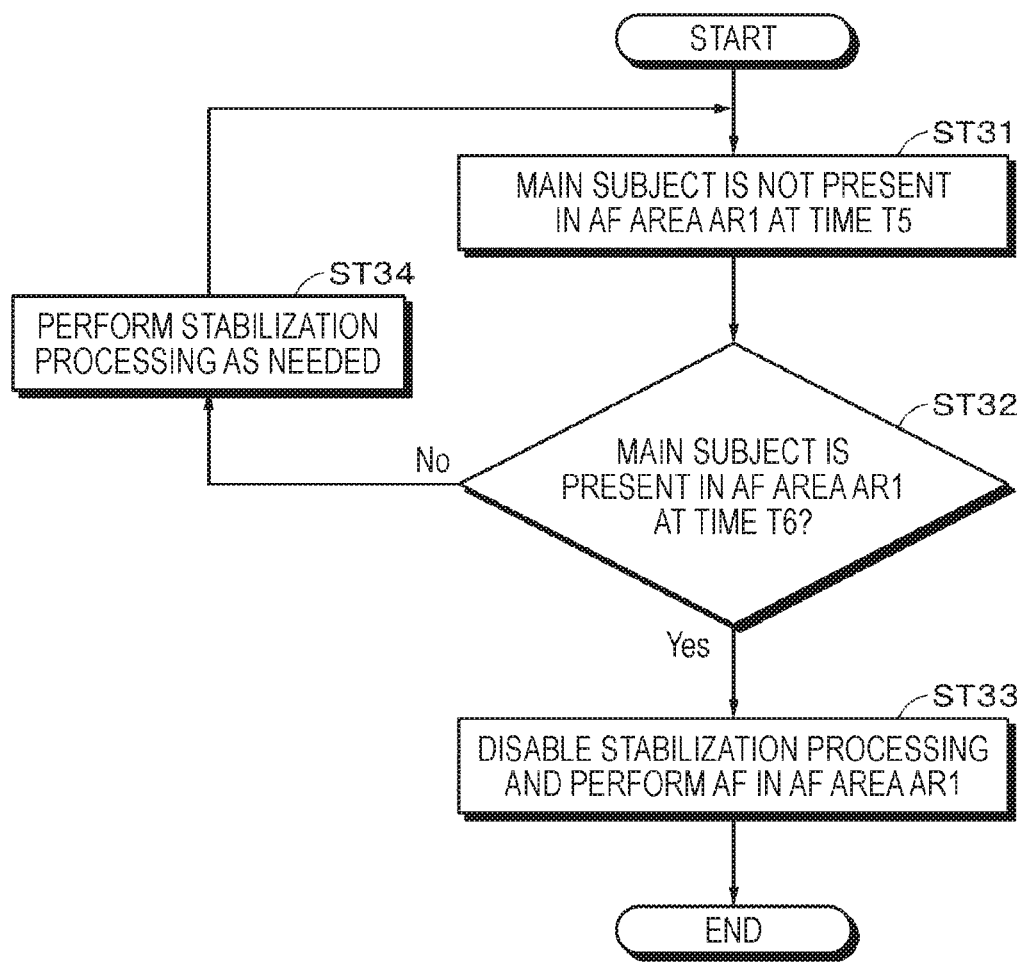
FIG. 13 is a flowchart showing a flow of processing of second control performed in the imaging device of the embodiment of the present disclosure.
Figure 14A:
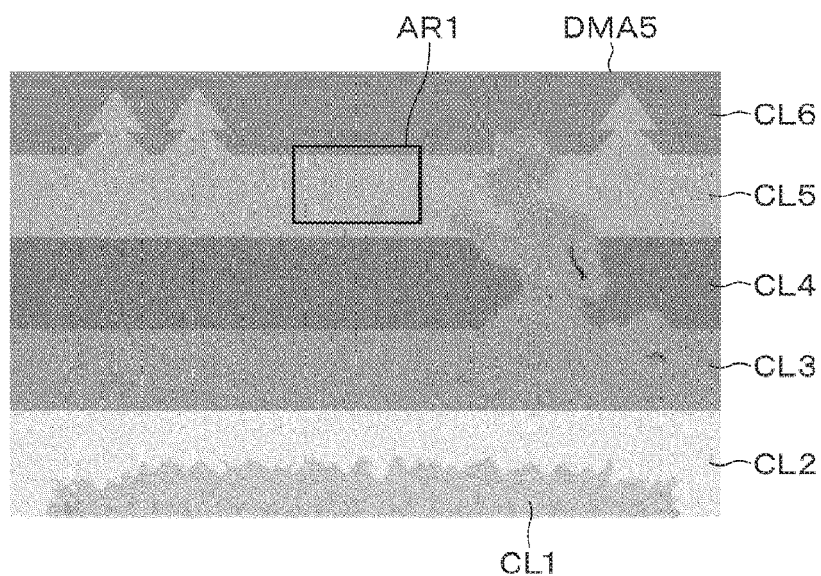
FIGS. 14A and 14B are diagrams for reference in describing the second control performed in the imaging device of the embodiment of the present disclosure.
Figure 14B:
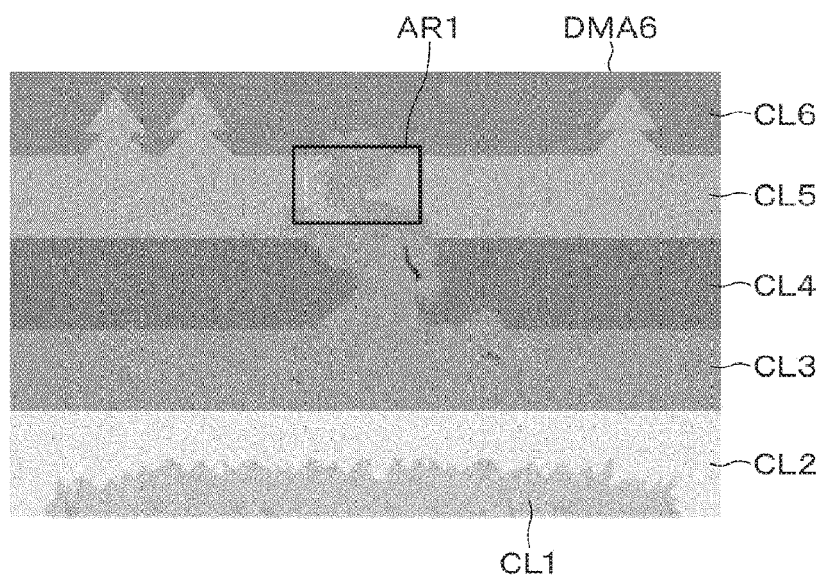

The second control example will be described in detail with reference to FIGS. 13, 14A and 14B. FIG. 13 is a flowchart showing a flow of processing in the second control. FIG. 14A shows a depth map DMA5 of an image IM5 acquired at a certain time T5, and FIG. 14B shows a depth map DMA6 of an image IM6 acquired at the most recent time T6. Note that the foreground depth range can be acquired in a similar manner as in the above-described processing using an image acquired before the images IM5 and IM6, and in this example, is cluster CL3 (for example, 6 to 9 meters). The following processing is performed by the control unit 34 (e.g., AF control unit 34D).

In step ST31 in the flowchart of FIG. 13, it is determined that the background is present in the AF area AR1 at time T5. For example, as shown in FIG. 14A, since the area of cluster CL3 is not included in the AF area AR1 set by the user, it is determined that the main subject is not present and the background is present in the AF area AR1. Then, the processing proceeds to step ST32.

In step ST32, an operation is performed to move the imaging device 1 to time T6 which is later than time T5. Then, at time T6, it is determined whether or not the main subject is present in the AF area AR1. For example, as shown in FIG. 14B, in a case where cluster CL3 is included in the area corresponding to the AF area AR1 in the depth map DMA6, it is determined that the main subject is present in the AF area AR1. Then, the processing proceeds to step ST33.

In step ST33, processing of disabling the stabilization processing is performed, and control is performed so that the stabilization processing is not performed. Then, AF is performed in the AF area AR1, and the face of the person H1, which is the main subject, is focused. Thus, in a case of shifting from a state where AF is performed on a background or the like which is not the main subject to a state where the AF area AR1 is aligned with the main subject, the return from the state where AF has slipped to the background or the like can be sped up.

If it is determined in step ST32 that the main subject is not present in the AF area AR1, the processing proceeds to step ST34. In step ST34, stabilization processing is performed as needed. In a case where the distance of objects included in the AF area AR1 corresponds to cluster CL5 or CL6 after the moving operation of the imaging device 1, the stabilization processing need not be performed. On the other hand, after the moving operation of the imaging device 1, even if the intention of the user is to include the main subject in the AF area AR1, an unintended person may be present or cut across in front of the main subject. Note, however, that a person present in a position closer to the imaging device 1 should be detected as cluster CL1 or CL2 in the AF area AR1. Accordingly, by performing the stabilization processing in such a case, the stability of the AF can be prevented from being impaired. Then, the processing returns to step ST31, and the above-described processing is repeated.

Third Control Example

Next, the third control will be described. The third control is an example in which stabilization processing is performed in a case where the movement of the main subject is followed.

Figure 15:
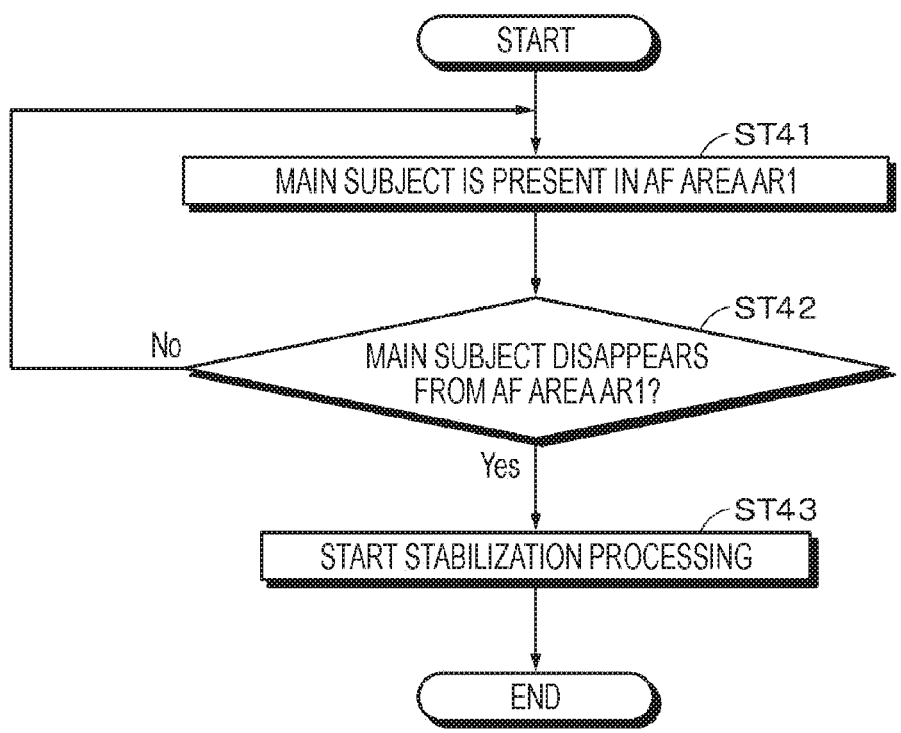

FIG. 15 is a flowchart showing a flow of processing in the third control. In step ST41, it is detected that the main subject is present in the AF area AR1 set by the user. For example, in a case where the area of cluster CL3 is included in the AF area AR1, it is determined that the main subject is present in the AF area AR1. Then, the processing proceeds to step ST42.

In step ST42, it is determined whether or not the main subject has disappeared from the AF area AR1 in the image acquired most recently. If the main subject continues to be present from the AF area AR1, the processing returns to step ST41. Additionally, if the main subject has disappeared from the AF area AR1, the processing proceeds to step ST43.

In step ST43, stabilization processing is performed so that the background is not focused even if the framing is removed from the main subject. For example, the lens drive mechanism 22A is controlled by the control unit 34, and the lens position is fixed. Note that in a case where no main subject is present in the AF area AR1 over several frames after the start of the stabilization processing, for example, the area corresponding to the AF area AR1 may be focused.

As described above, according to the third control, if the foreground depth range exists, in other words, if the main subject is present, in the AF area AR1 during the AF operation, it is determined that the AF is performed on the main subject, and the focus position is locked so as not to move significantly. As a result, even if the main subject temporarily slips from the AF area AR1 while the main subject is being followed by the imaging device 1, it is possible to prevent the focus from shifting to the background.

As described above, the foreground depth range information MD can be used to detect the main subject in the latest frame, and various control of AF can be achieved.

2. Modification

The first control to the third control in the above-described embodiment do not have to be independent control, but may be control related to one another. For example, the second control may be performed after it is determined in the first control that the main subject is not present in the expanded AF area AR1. Further, different control may be performed depending on the mode set in the imaging device 1

In the example of the above-described embodiment, the main subject detection unit 34A detects movement on the basis of the difference between frames, and the moving subject is regarded as the main subject. However, the present invention is not limited to this. For example, the main subject detection unit 34A may detect movement by optical flow. In addition, subject recognition such as face recognition and person recognition or subject tracking may be used, and the main subject may be identified on the basis of the result. A subject present in an area designated by the user or a specific color range designated by the user may be regarded as the main subject. The main subject-likeness may be learned and the result obtained may be regarded as the main subject. It is also possible to identify the main subject using saliency, which is a technology for extracting a prominent area on the screen. Additionally, the main subject may be identified by combining these methods.

In the embodiment described above, the depth detection unit 34B obtains distance information using the sensor information acquired by the image plane phase difference AF sensor 12B and the dedicated phase difference AF sensor 13. However, the present invention is limited to this. For example, the depth detection unit 34B may acquire distance information on the basis of the result of stereo vision by a multi-view camera, may acquire distance information using a light field camera, or may acquire distance information using a triangulation sensor. In addition, distance information may be acquired using images of multiple frames (using motion parallax), or distance information may be acquired using the degree of blurring. The method of acquiring distance information using the degree of blurring is called depth from defocus (DFD).

The method of clustering in the embodiment described above is not limited to the k-means method, and a known method may be applied.

In the embodiment described above, the distance range in which the main subject is present in the latest frame may be colored, or may be surrounded by a frame, for example, to be presented to the user as a UI. For example, the display 15 may be caused to function as a presentation unit, and the distance range in which the main subject is present in the latest frame may be distinguished from other portions and be displayed on the display 15. The display 15 may be separate from the imaging device 1.

The order of the processing in the first to third control described above may be changed, or the processing may be performed in parallel. For example, in the flow of the processing shown in FIG. 9, the processing of steps ST11 and ST12 may be performed in parallel.

In the above-described embodiment, the processing of fixing the lens position has been described as one example of stabilization processing. However, the lens may be moved to some degree as long as the focus is not shifted largely. Fixing the lens position not only means zero movement of the lens position, but also allowing some degree of movement as long as the focus is not largely shifted. Additionally, a certain sensitivity to the stabilization processing may be set. For example, the lens position may be fixed or allowed to vary within a predetermined range depending on the set sensitivity.

The imaging device in the embodiment described above may be incorporated in medical equipment such as a microscope, a smartphone, a computer device, a game device, a robot, a security camera, or a movable body (e.g., vehicle, train, airplane, helicopter, small flying object, construction vehicle, and agricultural vehicle).

The present disclosure can be implemented by a control device (e.g., microcomputer with one chip) having the control unit 34, can be implemented as an imaging system including multiple devices, and can be implemented as a method or a program, for example. For example, a program for performing control described in the embodiment may be provided in a downloadable form, and an imaging device (e.g., imaging device included in smartphone) having no control function described in the embodiment may download and install the program to perform control described in the embodiment in the imaging device.

3. Application Example

The technology of the present disclosure (present technology) can be applied to various products. For example, the technology of the present disclosure may be implemented as a device mounted on various types of movable bodies including a car, an electric car, a hybrid electric car, a motorcycle, a bicycle, personal mobility, an airplane, a drone, a ship, and a robot, for example. The ranging result of the present disclosure can be used, for example, for setting and maintaining a focused area in sensing, automatic driving assistance for dangerous driving, and the like.

Figure 16:
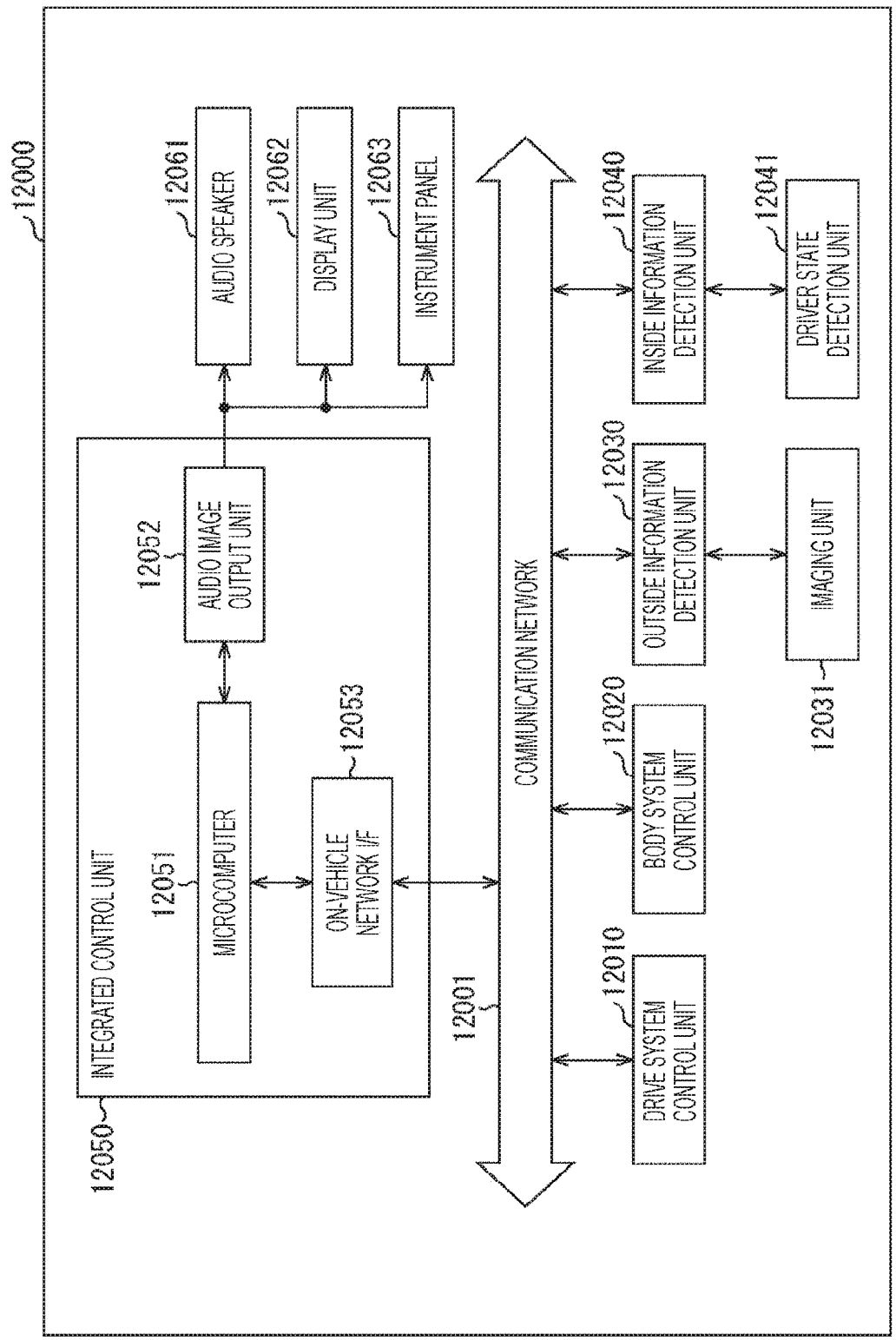

FIG. 16 is a block diagram showing a schematic configuration example of a vehicle control system which is one example of a movable body control system to which the technology of the present disclosure can be applied.

A vehicle control system 12000 includes multiple electronic control units connected through a communication network 12001. In the example shown in FIG. 16, the vehicle control system 12000 includes a drive system control unit 12010, a body system control unit 12020, an outside information detection unit 12030, an inside information detection unit 12040, and an integrated control unit 12050. Additionally, as a functional configuration of the integrated control unit 12050, a microcomputer 12051, an audio image output unit 12052, and an on-vehicle network interface (I/F) 12053 are illustrated.

The drive system control unit 12010 controls the operation of devices related to a drive system of the vehicle according to various programs. For example, the drive system control unit 12010 functions as a control device of a drive force generation device for generating a drive force of a vehicle such as an internal combustion engine or a drive motor, a drive force transmission mechanism for transmitting the drive force to wheels, a steering mechanism that adjusts the steering angle of the vehicle, and a braking device that generates a braking force of the vehicle.

The body system control unit 12020 controls the operation of various devices equipped on the vehicle body according to various programs. For example, the body system control unit 12020 functions as a control device of a keyless entry system, a smart key system, a power window device, or of various lamps such as a head lamp, a back lamp, a brake lamp, a turn indicator, or a fog lamp. In this case, the body system control unit 12020 can receive a radio wave transmitted from a portable device that substitutes for a key or a signal of various switches. The body system control unit 12020 receives input of the radio wave or signals and controls the door lock device, the power window device, the lamp, or the like of the vehicle.

The outside information detection unit 12030 detects information outside the vehicle on which the vehicle control system 12000 is mounted. For example, an imaging unit 12031 is connected to the outside information detection unit 12030. The outside information detection unit 12030 causes the imaging unit 12031 to capture an image of the outside of the vehicle, and receives the captured image. The outside information detection unit 12030 may perform object detection processing or distance detection processing of a person, a vehicle, an obstacle, a sign, characters on a road surface, or the like on the basis of the received image.

The imaging unit 12031 is an optical sensor that receives light and outputs an electrical signal according to the amount of light received. The imaging unit 12031 can output an electric signal as an image, or can output the electric signal as ranging information. Further, the light received by the imaging unit 12031 may be visible light or non-visible light such as infrared light.

The inside information detection unit 12040 detects information regarding the inside of the vehicle. For example, a driver state detection unit 12041 that detects a state of a driver is connected to the inside information detection unit 12040. The driver state detection unit 12041 includes, for example, a camera for capturing an image of the driver, and the inside information detection unit 12040 may calculate the degree of fatigue or concentration of the driver on the basis of detection information input from the driver state detection unit 12041, or may determine whether the driver is asleep.

The microcomputer 12051 can calculate a control target value of the drive force generation device, the steering mechanism, or the braking device on the basis of information regarding the inside or outside of the vehicle acquired by the outside information detection unit 12030 or the inside information detection unit 12040, and output a control command to the drive system control unit 12010. For example, the microcomputer 12051 can perform coordinated control aimed to achieve the functions of an advanced driver assistance system (ADAS) including collision avoidance or shock mitigation of a vehicle, follow-up traveling based on the inter-vehicle distance, constant-speed traveling, vehicle collision warning, vehicle lane departure warning, or the like.

Further, the microcomputer 12051 can control the drive force generation device, the steering mechanism, the braking device, and the like on the basis of information regarding the periphery of the vehicle acquired by the outside information detection unit 12030 or the inside information detection unit 12040, and thereby perform coordinated control aimed for automatic driving, for example, of traveling autonomously without depending on the driver's operation.

Further, the microcomputer 12051 can output a control command to the body system control unit 12030 on the basis of the information regarding the outside of the vehicle acquired by the outside information detection unit 12030. For example, the microcomputer 12051 can control the headlamp according to the position of a preceding vehicle or an oncoming vehicle detected by the outside information detection unit 12030, and perform coordinated control aimed to avoid glare such as switching from high beam to low beam.

The audio image output unit 12052 transmits an output signal of at least one of audio or image to an output device capable of visually or aurally notifying a passenger or the outside of a vehicle of information. In the example of FIG. 16, an audio speaker 12061, a display unit 12062, and an instrument panel 12063 are illustrated as the output device. The display unit 12062 may include at least one of an onboard display or a head-up display, for example.

Figure 17:
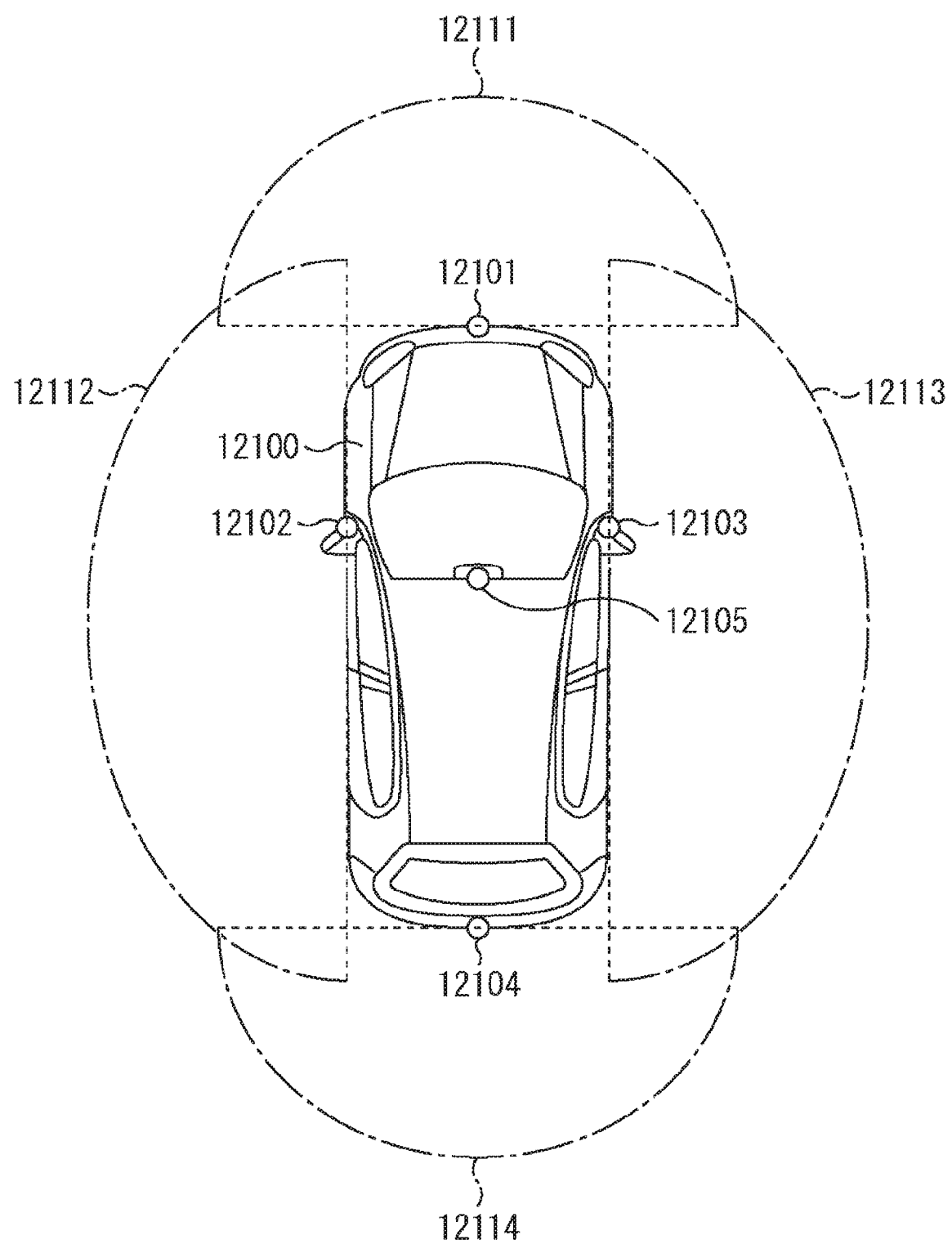

FIG. 17 is a diagram showing an example of an installation position of the imaging unit 12031.

In FIG. 17, imaging units 12101, 12102, 12103, 12104, and 12105 are included as the imaging unit 12031.

For example, the imaging units 12101, 12102, 12103, 12104, and 12105 are provided in positions such as a front nose, a side mirror, a rear bumper, a back door, and an upper portion of a windshield in a vehicle compartment of the vehicle 12100. The imaging unit 12101 provided on the front nose and the imaging unit 12105 provided on the upper portion of the windshield in the vehicle compartment mainly acquire images of the front of the vehicle 12100. The imaging units 12102 and 12103 provided on the side mirrors mainly acquire images of the side of the vehicle 12100. The imaging unit 12104 provided on the rear bumper or the back door mainly acquires an image of the rear of the vehicle 12100. The imaging unit 12105 provided on the upper portion of the windshield in the vehicle compartment is mainly used to detect a preceding vehicle or a pedestrian, an obstacle, a traffic light, a traffic sign, a lane, or the like.

Note that FIG. 17 shows one example of the imaging range of the imaging units 12101 to 12104. The imaging range 12111 indicates the imaging range of the imaging unit 12101 provided on the front nose, the imaging ranges 12112 and 12113 indicate the imaging ranges of the imaging units 12102 and 12103 respectively provided on the side mirrors, and the imaging range 12114 indicates the imaging range of the imaging unit 12104 provided on the rear bumper or the back door. For example, by superimposing the pieces of image data captured by the imaging units 12101 to 12104 on one another, a bird's eye view of the vehicle 12100 viewed from above can be obtained.

At least one of the imaging units 12101 to 12104 may have a function of acquiring distance information. For example, at least one of the imaging units 12101 to 12104 may be a stereo camera including multiple image sensors, or may be an image sensor having pixels for phase difference detection.

For example, the microcomputer 12051 can measure the distance to each three-dimensional object in imaging ranges 12111 to 12114 and the temporal change of this distance (relative velocity with respect to vehicle 12100) on the basis of distance information obtained from the imaging units 12101 to 12104, to extract, in particular, the closest three-dimensional object on the traveling path of the vehicle 12100 traveling at a predetermined speed (e.g., 0 km/h or more) in substantially the same direction as the vehicle 12100 as the preceding vehicle. Further, the microcomputer 12051 can set an inter-vehicle distance to be secured in advance before the preceding vehicle, and can perform automatic brake control (including follow-up stop control), automatic acceleration control (including follow-up start control), and the like. As described above, it is possible to perform coordinated control aimed for automatic driving, for example, of traveling autonomously without depending on the driver's operation.

For example, the microcomputer 12051 can extract while classifying three-dimensional object data related to three-dimensional objects into two-wheeled vehicles, ordinary vehicles, large vehicles, pedestrians, and other three-dimensional objects such as telephone poles on the basis of distance information obtained from the imaging units 12101 to 12104, and use the data for automatic avoidance of obstacles. For example, the microcomputer 12051 identifies obstacles around the vehicle 12100 as obstacles visible to the driver of the vehicle 12100 and obstacles difficult to see from the driver of the vehicle 12100. Then, the microcomputer 12051 determines the collision risk indicating the degree of risk of collision with each obstacle, and when the collision risk is a set value or more and there is a possibility of a collision, can perform driving support for avoiding collision by outputting a warning to the driver through the audio speaker 12061 or the display unit 12062, or performing forcible deceleration or steering for avoidance through the drive system control unit 12010.

At least one of the imaging units 12101 to 12104 may be an infrared camera that detects infrared light. For example, the microcomputer 12051 can recognize a pedestrian by determining whether or not a pedestrian is present in the images captured by the imaging units 12101 to 12104. Such pedestrian recognition is carried out by a procedure of extracting feature points in images captured by the imaging units 12101 to 12104 as an infrared camera, and a procedure of performing pattern matching processing on a series of feature points indicating the outline of an object to determine whether or not the object is a pedestrian, for example. If the microcomputer 12051 determines that a pedestrian is present in the captured image of the imaging units 12101 to 12104 and recognizes the pedestrian, the audio image output unit 12052 causes the display unit 12062 to superimpose and display a square outline for emphasizing to the recognized pedestrian. Further, the audio image output unit 12052 may cause the display unit 12062 to display an icon or the like indicating a pedestrian in a desired position.

One example of the vehicle control system to which the technology of the present disclosure can be applied has been described above. Of the above-described configuration, the technology of the present disclosure is applicable to the imaging unit 12031. Specifically, the imaging device 1 of FIG. 2 can be applied to the imaging unit 12031. For example, by applying the technology of the present disclosure to a car, the distance to an obstacle outside the car can be appropriately detected, so that the automatic driving control system and the automatic braking system operate properly, enabling safe and comfortable driving. Note that in a case where the ranging result is used for setting and maintaining an attention area in sensing or automatic driving assistance for dangerous driving or the like, for example, control performed by the control unit 34 is not limited to lens control according to the ranging result.

The present disclosure can also adopt the following configurations.

(1)

A control device including:

a main subject detection unit that detects a first main subject from among subjects included in a first image, and acquires main subject information indicating the first main subject;

a distance information calculation unit that detects a distance of the subject included in the first image, and acquires first distance information indicating the distance; and a detection unit that detects a distance within which the first main subject is included on the basis of the main subject information and the first distance information, and acquires main subject distance information indicating the distance within which the first main subject is included.

(2)

The control device according to (1), in which the distance information calculation unit detects a distance of a subject included in a second image acquired later in time than the first image, and acquires second distance information indicating the distance, and the control device further includes a control unit that detects a second main subject from among the subjects included in the second image on the basis of the main subject distance information and the second distance information.

(3)

The control device according to (2), in which the control unit controls lens movement on the basis of a detection result of the second main subject.

(4)

The control device according to (2) or (3), in which the control unit controls lens movement such that a first area set in an imaging range of an imaging unit is in focus in a case where the second main subject is present in the first area, and performs control to set a second area obtained by expanding the first area in a case where the second main subject is not present in the first area.

(5)

The control device according to (4), in which the control unit controls the lens movement such that the second area is in focus in a case where the second main subject is present in the second area, and controls the lens movement such that the first area is in focus in a case where the second main subject is not present in the second area.

(6)

The control device according to (2) or (3), in which the control unit performs control to disable stabilization processing in a case where the first main subject is not present in a first area set in an imaging range of an imaging unit and the second main subject is present in the first area.

(7)

The control device according to (2) or (3), in which the control unit performs control to enable stabilization processing in a case where the first main subject is present in a first area set in an imaging range of an imaging unit and the second main subject is not present in the first area.

(8)

The control device according to any one of (1) to (7), in which the detection unit classifies the first distance information into clusters, and refers to the main subject information to acquire information indicating a cluster whose proportion of the first main subject is equal to or more than a predetermined threshold as the main subject distance information.

(9)

The control device according to any one of (1) to (7), in which the detection unit classifies the first distance information into clusters, and refers to the main subject information to acquire information indicating a cluster with a largest proportion of the first main subject as the main subject distance information.

(10)

The control device according to any one of (1) to (9), in which the distance indicates a predetermined distance range.

(11)

The control device according to any one of (4), (5), and (9), in which the first area is one area selected by a user from among multiple selectable autofocus areas displayed on a display unit.

(12)

The control device according to any one of (4), (7), (8), and (9), in which the second area is an area not displayed on the display unit.

(13)

The control device according to any one of (4), (7), (8), and (9), in which the second area is an area temporarily displayed on the display unit.

(14)

The control device according to (4), (7), (8), and (9), in which the stabilization processing is processing of fixing a lens position.

(15)

The control device according to any one of (2) to (14), in which the second image is an image acquired most recently.

(16)

An imaging device including:

the control device according to any one of (1) to (15); and an imaging unit.

(17)

The imaging device according to (16), further including a presentation unit that presents a range of the second main subject.

(18)

The imaging device according to (16), further including a lens drive unit, in which lens movement is controlled by the control device controlling the lens drive unit.

(19)

A control method including:

by a main subject detection unit, detecting a first main subject from among subjects included in a first image, and acquiring main subject information indicating the first main subject;

by a distance information calculation unit, detecting a distance of the subject included in the first image, and acquiring first distance information indicating the distance; and by a detection unit, detecting a distance within which the first main subject is included on the basis of the main subject information and the first distance information, and acquiring main subject distance information indicating the distance within which the first main subject is included.

(20)

A program that causes a computer to execute a control method including:

by a main subject detection unit, detecting a first main subject from among subjects included in a first image, and acquiring main subject information indicating the first main subject;

by a distance information calculation unit, detecting a distance of the subject included in the first image, and acquiring first distance information indicating the distance; and by a detection unit, detecting a distance within which the first main subject is included on the basis of the main subject information and the first distance information, and acquiring main subject distance information indicating the distance within which the first main subject is included.

REFERENCE SIGNS LIST

1 Imaging device
15 Display
34 Control unit
34A Main subject detection unit
34B Depth detection unit
34C Foreground depth range detection unit
34D AF control unit
IM1 First image
IM2 Second image
MA1 Main subject map
DMA1 Depth map
MD Foreground depth range information
CL Cluster
AR AF area

The invention claimed is:

1. A control device, comprising:
   circuitry configured to:
   control acquisition of a first image;
   detect a first main subject from a first plurality of subjects in the first image;
   acquire specific main subject information indicating the first main subject;
   detect a first plurality of distances of the first plurality of subjects in the first image, wherein
      each distance of the first plurality of distances corresponds to a respective subject of the first plurality of subjects, and
      the each distance is from a first point to the respective subject in a depth direction in the first image;
   acquire first distance information indicating the first plurality of distances;
   detect a first distance from the first plurality of distances in the first image, wherein
      the first distance is of the first main subject in the first image, and
      the first distance is detected based on the specific main subject information and the first distance information;
   acquire main subject distance information indicating the first distance of the first main subject;
   control acquisition of a second image subsequent to the first image;
   detect a second plurality of distances of a second plurality of subjects in the second image, wherein
      each distance of the second plurality of distances corresponds to a respective subject of the second plurality of subjects, and
      the each distance of the second plurality of distances is from a second point to the respective subject, of the second plurality of subjects, in a depth direction in the second image;
   acquire second distance information that indicates the second plurality of distances; and
   detect a second main subject from the second plurality of subjects in the second image based on the main subject distance information and the second distance information.

2. The control device according to claim 1, wherein the circuitry is further configured to control lens movement of a lens of an imaging system based on the detection of the second main subject.

3. The control device according to claim 1, wherein the circuitry is further configured to control lens movement of a lens of an imaging system to:
   focus on a first area, in an imaging range of the imaging system, based on presence of the second main subject in the first area;
   expand the first area, to a second area in the imaging range, based on absence of the second main subject is in the first area; and
   focus on the second area in the imaging range.

4. The control device according to claim 3, wherein the circuitry is further configured to control the lens movement to:
   focus on the second area based on presence of the second main subject in the second area; and
   focus on the first area based on absence of the second main subject in the second area.

5. The control device according to claim 1, wherein the circuitry is further configured to disable a stabilization process based on:
   absence of the first main subject in a first area in an imaging range of an imaging system, and
   presence of the second main subject in the first area.

6. The control device according to claim 1, wherein the circuitry is further configured to enable a stabilization process based on:
   presence of the first main subject in a first area in an imaging range of an imaging system, and
   absence of the second main subject in the first area.

7. The control device according to claim 1, wherein the circuitry is further configured to:
   classify the first distance information into a plurality of clusters; and
   acquire cluster information, indicating a cluster of the plurality of clusters, as the main subject distance information, wherein
      the cluster information is acquired based on the specific main subject information, and
      a proportion of the first main subject in the cluster is one of equal to or more than a threshold.

8. The control device according to claim 1, wherein the circuitry is further configured to:
   classify the first distance information into a plurality of clusters, and
   acquire cluster information, indicating a cluster of the plurality of clusters, as the main subject distance information, wherein
      the cluster information is acquired based on the specific main subject information, and
      the cluster has a largest proportion of the first main subject among the plurality of clusters.

9. The control device according to claim 3, wherein the circuitry is further configured to:
   control a display screen to display a plurality of selectable autofocus areas including the first area; and
   receive a user selection of the first area among the displayed plurality of selectable autofocus areas.

10. The control device according to claim 9, wherein the second area is not displayed on the display screen.

11. The control device according to claim 9, wherein the circuitry is further configured to control the display screen to temporarily display the second area.

12. The control device according to claim 5, wherein the circuitry is further configured to control execution of the stabilization process to fix a lens position of a lens of the imaging system.

13. An imaging device, comprising:
   an image sensor; and
   a control device, wherein the control device is configured to:
   control the image sensor to:
      acquire a first image; and
      acquire a second image subsequent to the first image;
   detect a first main subject from a first plurality of subjects in the first image;
   acquire specific main subject information indicating the first main subject;
   detect a first plurality of distances of the first plurality of subjects in the first image, wherein
      each distance of the first plurality of distances corresponds to a respective subject of the first plurality of subjects, and
      the each distance is from a first point to the respective subject in a depth direction in the first image;
   acquire first distance information indicating the first plurality of distances;

detect a first distance from the first plurality of distances in the first image, wherein
the first distance is of the first main subject in the first image, and
the first distance is detected based on the specific main subject information and the first distance information;
acquire main subject distance information indicating the first distance of the first main subject;
detect a second plurality of distances of a second plurality of subjects in the second image, wherein
each distance of the second plurality of distances corresponds to a respective subject of the second plurality of subjects, and
the each distance of the second plurality of distances is from a second point to the respective subject, of the second plurality of subjects, in a depth direction in the second image;
acquire second distance information that indicates the second plurality of distances; and
detect a second main subject from the second plurality of subjects in the second image based on the main subject distance information and the second distance information.

14. The imaging device according to claim 13, wherein the control device is further configured to control a display screen to present a distance, of the second plurality of distances, of the second main subject.

15. The imaging device according to claim 13, further comprising:
a lens; and
a lens drive mechanism, wherein the control device is further configured to control the lens drive mechanism to control lens movement of the lens.

16. A control method, comprising:
controlling acquisition of a first image;
detecting a first main subject from a first plurality of subjects in the first image;
acquiring specific main subject information indicating the first main subject;
detecting a first plurality of distances of the first plurality of subjects in the first image, wherein
each distance of the first plurality of distances corresponds to a respective subject of the first plurality of subjects, and
the each distance is from a first point to the respective subject in a depth direction in the first image;
acquiring first distance information indicating the first plurality of distances;
detecting a first distance from the first plurality of distances in the first image, wherein
the first distance is of the first main subject in the first image, and
the first distance is detected based on the specific main subject information and the first distance information;
acquiring main subject distance information indicating the first distance of the first main subject;
controlling acquisition of a second image subsequent to the first image;
detecting a second plurality of distances of a second plurality of subjects in the second image, wherein
each distance of the second plurality of distances corresponds to a respective subject of the second plurality of subjects, and
the each distance of the second plurality of distances is from a second point to the respective subject, of the second plurality of subjects, in a depth direction in the second image;
acquiring second distance information that indicates the second plurality of distances; and
detecting a second main subject from the second plurality of subjects in the second image based on the main subject distance information and the second distance information.

17. A non-transitory computer-readable medium having stored thereon, computer-executable instructions which, when executed by a computer, cause the computer to execute operations, the operations comprising:
controlling acquisition of a first image;
detecting a first main subject from a first plurality of subjects in the first image;
acquiring specific main subject information indicating the first main subject;
detecting a first plurality of distances of the first plurality of subjects in the first image, wherein
each distance of the first plurality of distances corresponds to a respective subject of the first plurality of subjects, and
the each distance is from a first point to the respective subject in a depth direction in the first image;
acquiring first distance information indicating the first plurality of distances;
detecting a first distance from the first plurality of distances in the first image, wherein
the first distance is of the first main subject in the first image, and
the first distance is detected based on the specific main subject information and the first distance information;
acquiring main subject distance information indicating the first distance of the first main subject;
controlling acquisition of a second image subsequent to the first image;
detecting a second plurality of distances of a second plurality of subjects in the second image, wherein
each distance of the second plurality of distances corresponds to a respective subject of the second plurality of subjects, and
the each distance of the second plurality of distances is from a second point to the respective subject, of the second plurality of subjects, in a depth direction in the second image;
acquiring second distance information that indicates the second plurality of distances; and
detecting a second main subject from the second plurality of subjects in the second image based on the main subject distance information and the second distance information.

* * * * *